(12) United States Patent
Song et al.

(10) Patent No.: US 12,120,453 B2
(45) Date of Patent: Oct. 15, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Wonseok Song, Suwon-si (KR); Shinhaeng Kim, Suwon-si (KR); Yoosun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 560 days.

(21) Appl. No.: 17/433,168

(22) PCT Filed: Jul. 26, 2021

(86) PCT No.: PCT/KR2021/009607
§ 371 (c)(1),
(2) Date: Aug. 23, 2021

(87) PCT Pub. No.: WO2022/131471
PCT Pub. Date: Jun. 23, 2022

(65) Prior Publication Data
US 2023/0140006 A1    May 4, 2023

(30) Foreign Application Priority Data

Dec. 15, 2020    (KR) .................. 10-2020-0175222

(51) Int. Cl.
*H04N 7/01*  (2006.01)
*G06T 3/4007*  (2024.01)
(Continued)

(52) U.S. Cl.
CPC ......... *H04N 7/0145* (2013.01); *G06T 3/4007* (2013.01); *H04N 5/145* (2013.01); *H04N 5/2625* (2013.01); *H04N 7/014* (2013.01)

(58) Field of Classification Search
CPC ..... H04N 7/0135–0147; H04N 19/577; H04N 19/587; H04N 19/51; H04N 5/145
See application file for complete search history.

(56) References Cited

U.S. PATENT DOCUMENTS

| 6,947,603 B2 | 9/2005 | Kim |
| 10,412,462 B2 | 9/2019 | Ivanovic |
(Continued)

FOREIGN PATENT DOCUMENTS

| CN | 109922231 A | 6/2019 |
| CN | 110689509 A | 1/2020 |
(Continued)

OTHER PUBLICATIONS

Weinzaepfel, Philippe, et al. "DeepFlow: Large displacement optical flow with deep matching." Proceedings of the IEEE international conference on computer vision. 2013. (Year: 2013).*

(Continued)

*Primary Examiner* — Vincent Rudolph
*Assistant Examiner* — Raphael Schwartz
(74) *Attorney, Agent, or Firm* — Sughrue Mion, PLLC

(57) ABSTRACT

An electronic apparatus includes a memory configured to store an input image and at least one processor configured to obtain two consecutive frames of the input image as input frames; obtain a first interpolation frame of the input frames and a first confidence corresponding to the first interpolation frame based on a first interpolation method; obtain a second interpolation frame of the input frames and a second confidence corresponding to the second interpolation frame based on a second interpolation method that is different from the first interpolation method; obtain weights corresponding to the first interpolation frame and the second interpolation (Continued)

frame, based on the first confidence and the second confidence, respectively; and obtain an output image based on the weights.

9 Claims, 19 Drawing Sheets

(51) Int. Cl.
*H04N 5/14* (2006.01)
*H04N 5/262* (2006.01)

(56) References Cited

U.S. PATENT DOCUMENTS

| | | |
|---|---|---|
| 10,679,326 B2 | 6/2020 | Tanaka |
| 10,733,714 B2 | 8/2020 | El-Khamy et al. |
| 11,394,958 B2 | 7/2022 | Ichigaya et al. |
| 2013/0136182 A1* | 5/2013 | Huang .................. H04N 19/56 375/E7.125 |
| 2013/0293533 A1 | 11/2013 | Akao |
| 2015/0189276 A1 | 7/2015 | Sugimoto et al. |
| 2017/0148137 A1* | 5/2017 | Tanaka .................. G06T 3/4007 |
| 2018/0132009 A1 | 5/2018 | Ivanovic |
| 2018/0205909 A1* | 7/2018 | Staranowicz .......... H04N 11/20 |
| 2020/0204760 A1 | 6/2020 | Takami et al. |
| 2020/0394752 A1* | 12/2020 | Liu ........................ G06T 3/4007 |
| 2021/0014481 A1 | 1/2021 | Ichigaya et al. |
| 2022/0321877 A1 | 10/2022 | Ichigaya et al. |

FOREIGN PATENT DOCUMENTS

| | | |
|---|---|---|
| JP | 2013-48372 A | 3/2013 |
| JP | 2013-235304 A | 11/2013 |
| JP | 5902814 A | 4/2016 |
| JP | 2017-103756 A | 6/2017 |
| JP | 2019-537913 A | 12/2019 |
| KR | 10-2019-0053074 A | 5/2019 |
| KR | 10-2020-0136443 A | 12/2020 |
| WO | 2019/168765 A1 | 9/2019 |

OTHER PUBLICATIONS

International Search Report dated Nov. 18, 2021 issued by the International Searching Authority in International Application No. PCT/KR2021/009607 (PCT/ISA/210).

International Written Opinion dated Nov. 18, 2021 issued by the International Searching Authority in International Application No. PCT/KR2021/009607 (PCT/ISA/237).

* cited by examiner

$$I_o(x,y) = \frac{c_A(x,y)}{c_A(x,y) + c_B(x,y)} I_A(x,y) + \frac{c_B(x,y)}{c_A(x,y) + c_B(x,y)} I_B(x,y)$$

720

$$I_o(x,y) = \frac{\overline{c_A}}{\overline{c_A} + \overline{c_B}} I_A(x,y) + \frac{\overline{c_B}}{\overline{c_A} + \overline{c_B}} I_B(x,y)$$

730

$$I_o(x,y) = c_A(x,y) I_A(x,y) + (1 - c_A(x,y)) I_B(x,y)$$

740

$$I_o(x,y) = (1 - c_B(x,y)) I_A(x,y) + c_B(x,y) I_B(x,y)$$

FIG. 7B $$W_A(x,y) = \frac{c_A(x,y)}{c_A(x,y) + c_B(x,y)}$$

750

$$w'_A(x,y) = \sum_{m=-k}^{k} \sum_{n=-k}^{k} F(m,n) w_A(x+m, y+n)$$

755

$$I_o(x,y) = w'_A(x,y) I_A(x,y) + (1 - w'_A(x,y)) I_B(x,y)$$

760

$$W'_A(x,y,t) = \alpha w_A(x,y,t) + (1-\alpha) w_A(x,y,t-1)$$

765

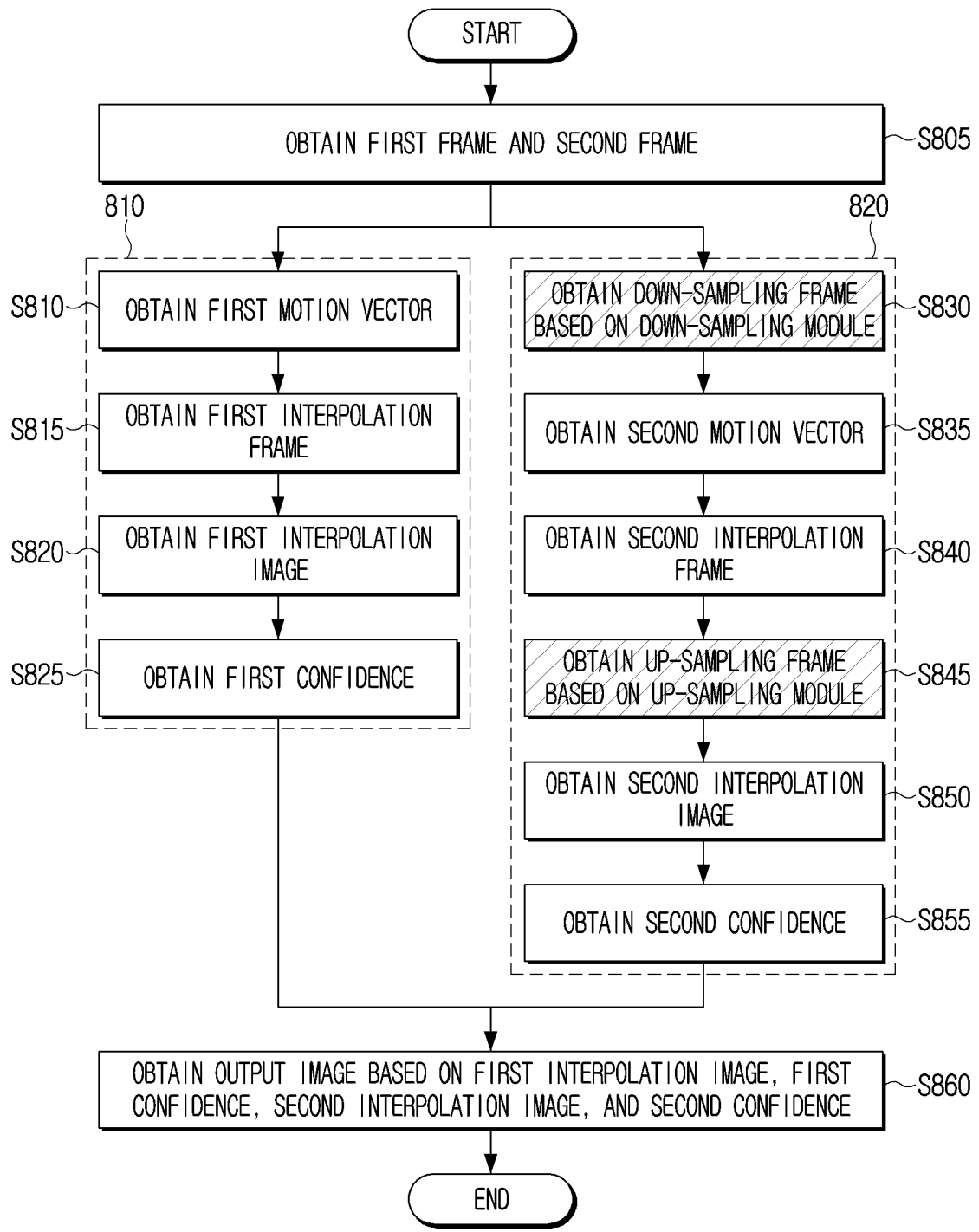

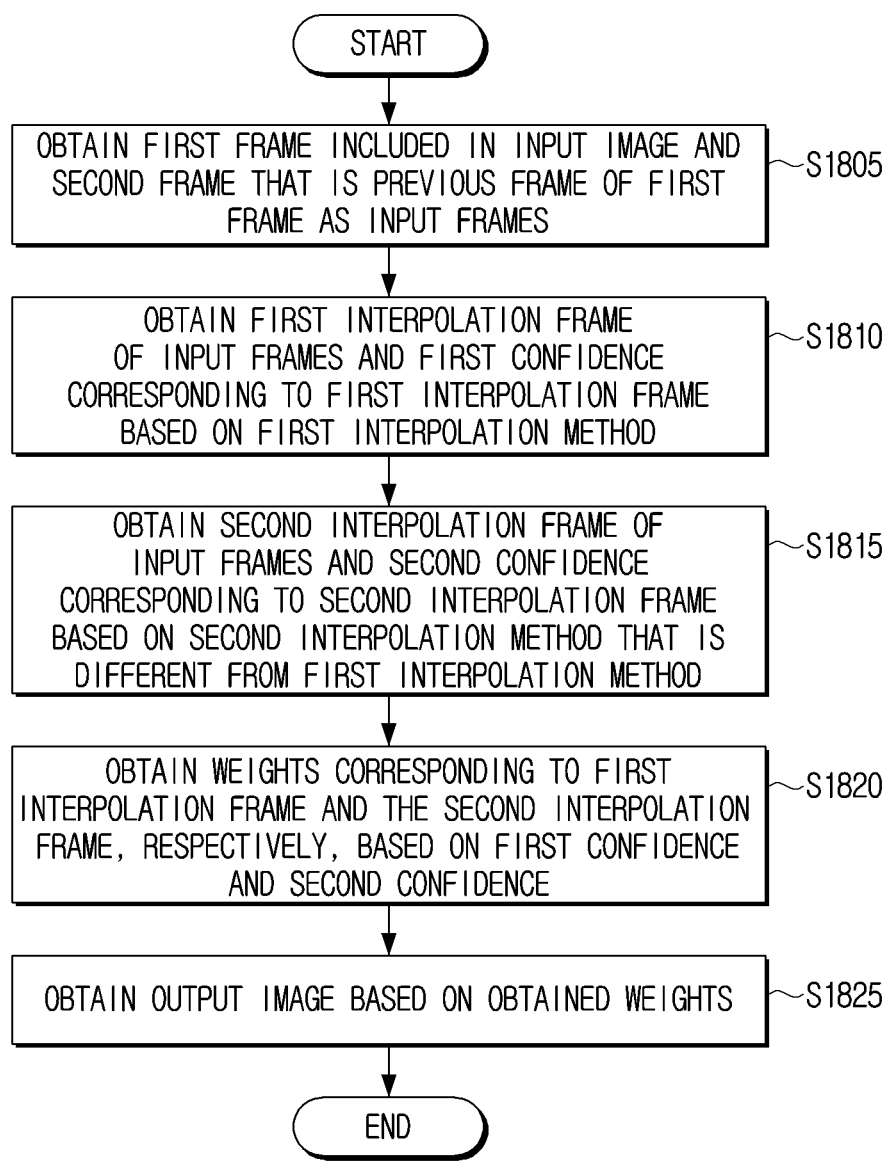

ELECTRONIC APPARATUS AND CONTROLLING METHOD THEREOF

TECHNICAL FIELD

The disclosure relates to an electronic apparatus for generating an interpolation image and a method for controlling thereof and, more particularly, to an electronic apparatus for combining interpolation images obtained by different interpolation methods and a method for controlling thereof.

CROSS-REFERENCE TO RELATED APPLICATIONS

This application claims benefit of priority to Korean Patent Application No. 10-2020-0175222, filed on Dec. 15, 2020, in the Korean Intellectual Property Office, the disclosure of which is incorporated by reference herein in its entirety.

BACKGROUND ART

A method for generating an interpolation frame used to generate an interpolation image may include a block-based interpolation technology, a differentiation-based interpolation technology, a deep learning-based interpolation technology, or the like.

The block-based interpolation technology may generate a prediction error due to a consistency assumption applied in the process of predicting motion vector field (MVF) and the limitation of a resolution and motion model derived from the block-based structure.

In the block-based structure, accurate matching is possible when objects are horizontally moved because an image is matched in block units in predicting the motion in the image, but when the object causes rotation, three-dimensional movement, deformation, or the like, failure in matching may frequently occur.

Even if an approximate motion is found, if an image is interpolated in a block unit, a natural deformation of the object may not be expressed, and a blocky artifact may frequently occur at a boundary between the blocks.

In addition, a problem that a shape of an object in the resultant image is broken, and the boundary of an object and inside the object shows a blocky phenomenon may occur, and the consistency assumption may have an advantage in predicting the motion of a wide area having a consistent movement, but may have a problem of increasing error for a small object or an object having a non-linear motion. In this case, a problem that a small object such as a baseball, a golf ball, etc., is seen as several objects or disappears may occur.

The differentiation-based interpolation technology may have a problem that it is difficult to detect a rapid motion beyond the local window, that the prediction performance is deteriorated when the brightness or shape of the image changes over time.

The deep learning-based interpolation technology may be implemented by training a system composed of a convolutional neural network (CNN) using image database (DB).

Accordingly, the performance of a trained network may largely vary according to the characteristics of the image DB used for learning and may output a weird result for the input image having the characteristics not included in the learning DB. Since a learning-based frame interpolation technology using a deep learning technology is a concept of generating (synthesizing) an intermediate frame from a trained model, distortion of an intermediate frame may be greater when a suitable model capable of processing an input image is not trained.

Since the frame interpolation system using deep learning mostly uses a very large and complex network, it may be impossible to implement the high-resolution operation in real time in consumer's home appliances such as a television (TV) or the like. Therefore, in order to utilize the advantages of deep learning-based frame interpolation technologies in home appliances, a technology for reducing the amount of processing and complexity is necessary.

DISCLOSURE

Technical Problem

Aspects of the disclosure are to address at lease the above-mentioned problems and/or advantages and to provide at least the advantages described below. Accordingly, an aspect of the disclosure is to provide an electronic apparatus for combining a plurality of interpolation images obtained according to different interpolation methods using a confidence obtained based on different interpolation methods and a method for controlling thereof.

Technical Solution

According to an embodiment of the present disclosure, an electronic apparatus may include: a memory configured to store an input image; and at least one processor configured to: obtain two consecutive frames of the input image as input frames, the two consecutive frames including a first frame and a second frame preceding the first frame; obtain a first interpolation frame of the input frames and a first confidence corresponding to the first interpolation frame based on a first interpolation method; obtain a second interpolation frame of the input frames and a second confidence corresponding to the second interpolation frame based on a second interpolation method that is different from the first interpolation method; obtain weights corresponding to the first interpolation frame and the second interpolation frame, based on the first confidence and the second confidence, respectively, and obtain an output image based on the weights.

The at least one processor may be further configured to: obtain a first motion vector of the input frames based on the first interpolation method; obtain the first interpolation frame corresponding to the first motion vector based on the first interpolation method; obtain a second motion vector of the input frames based on the second interpolation method; obtain the second interpolation frame corresponding to the second motion vector based on the second interpolation method; obtain a combined interpolation frame based on the first interpolation frame and the second interpolation frame, and obtain the output image based on the first frame, the second frame, and the combined interpolation frame.

The at least one processor may be further configured to: obtain the first confidence based on at least one of the first motion vector or the first interpolation frame, and obtain the second confidence based on at least one of the second motion vector or the second interpolation frame.

The at least one processor may be further configured to: obtain down-sampled frames of the input frames based on the second interpolation method; obtain the second motion vector corresponding to the down-sampled frames; obtain an up-sampled frame of the second interpolation frame based on the second interpolation method; and obtain the combined interpolation frame based on an up-sampled frame of the first interpolation frame and the up-sampled frame of the second interpolation frame.

The at least one processor may be further configured to identify an area of the input image in which a degree of motion is greater than or equal to a threshold value, based on the first frame and the second frame, and obtain down-sampled frames of the input frames by down-sampling the identified area.

The at least one processor may be further configured to: obtain a first weight corresponding to the first interpolation frame and a second weight corresponding to the second interpolation frame, based on the first confidence and the second confidence, respectively, and obtain the output image in which the first interpolation frame and the second interpolation frame are combined based on the first weight and the second weight.

The at least one processor may be further configured to: obtain the first confidence and the second confidence corresponding to pixels of the first interpolation frame and the second interpolation frame, respectively; obtain the weights corresponding to the pixels included in the first interpolation frame and the second interpolation frame, respectively, based on the first confidence and the second confidence; and obtain the output image by applying the weights to the pixels, respectively.

The at least one processor may be further configured to: obtain the first confidence and the second confidence corresponding to pixels of the first interpolation frame and the second interpolation frame, respectively; obtain the weights corresponding to each of pixel areas included in the first interpolation frame and the second interpolation frame, respectively, based on the first confidence and the second confidence; and obtain the output image by applying the weights to the pixel areas, respectively, wherein the pixel area may include a plurality of pixels.

The at least one processor may be further configured to, based on the first confidence and the second confidence being less than a threshold, obtain the output image based on the second interpolation frame.

The first interpolation method may be a block-based interpolation method and the second interpolation method is a machine learning-based interpolation method.

According to an embodiment of the present disclosure, a method for controlling an electronic apparatus, may include: obtaining two consecutive frames of an input image as input frames, the two consecutive frames corresponding to a first frame and a second frame preceding the first frame; obtaining a first interpolation frame of the input frames and a first confidence corresponding to the first interpolation frame based on a first interpolation method; obtaining a second interpolation frame of the input frames and a second confidence corresponding to the second interpolation frame based on a second interpolation method that is different from the first interpolation method; obtaining weights corresponding to the first interpolation frame and the second interpolation frame, based on the first confidence and the second confidence, respectively; and obtaining an output image based on the weights.

The method may further include: obtaining a first motion vector of the input frames based on the first interpolation method; obtaining the first interpolation frame corresponding to the first motion vector based on the first interpolation method; obtaining a second motion vector of the input frames based on the second interpolation method; obtaining the second interpolation frame corresponding to the second motion vector based on the second interpolation method; obtaining a combined interpolation frame based on the first interpolation frame and the second interpolation frame; and obtaining the output image based on the first frame, the second frame, and the combined interpolation frame.

The obtaining the first confidence and the second confidence may include: obtaining the first confidence based on at least one of the first motion vector or the first interpolation frame, and obtaining the second confidence based on at least one of the second motion vector or the second interpolation frame.

The method may further include: obtaining down-sampled frames of the input frames based on the second interpolation method; obtaining the second motion vector corresponding to the down-sampled frames; obtaining an up-sampled frame of the second interpolation frame based on the second interpolation method; and obtaining the combined interpolation frame based on an up-sampled frame of the first interpolation frame and the up-sampled frame of the second interpolation frame.

The obtaining the down-sampled frames may include identifying an area of the input image in which a degree of motion is greater than or equal to a threshold value based on the first frame and the second frame, and obtaining down-sampled frames corresponding to the input frames by down-sampling the identified area.

DESCRIPTION OF DRAWINGS

The above and/or other aspects will be more apparent by describing certain example embodiments, with reference to the accompanying drawings, in which:

FIG. 7A is a diagram illustrating an embodiment of obtaining an output image based on first confidence and second confidence;

FIG. 7B is a diagram illustrating an operation of performing weight filtering in generating an output image;

FIG. 8 is a flowchart illustrating an embodiment of performing down-sampling and up-sampling operations in one interpolation method of a plurality of interpolation methods;

FIG. 18 is a flowchart illustrating a method for controlling an electronic apparatus according to an embodiment.

Throughout the drawings, it should be noted that like reference numbers are used to depict the same or similar elements, features, and structures.

MODE FOR INVENTION

Figure 1:
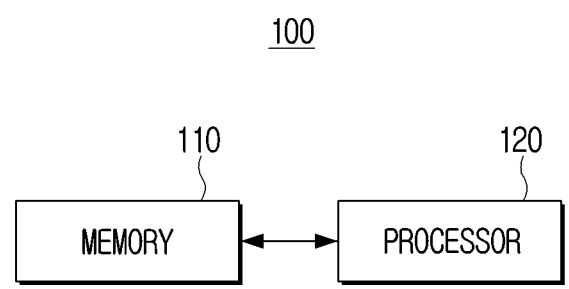
FIG. 1 is a block diagram illustrating an electronic apparatus according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It is to be understood that terms such as "comprise" or "consist of" are used herein to designate a presence of a characteristic, number, step, operation, element, component, or a combination thereof, and not to preclude a presence of additional characteristics.

Expressions such as "at least one of," when existing a list of elements, modify the entire list of elements and do not modify the individual elements of the list. For example, the expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

In the disclosure, a "user" may refer to a person using an electronic apparatus or an artificial intelligence electronic apparatus using an electronic apparatus (e.g., artificial intelligence electronic apparatus).

The disclosure will be described in greater detail with reference to the attached drawings.

FIG. 1 is a block diagram illustrating an electronic apparatus according to an embodiment.

Referring to FIG. 1, a memory 110 and a processor 120 may be included.

The electronic apparatus 100 according to various embodiments, for example, may be implemented as at least one of smartphones, tablet PCs, mobile phones, video telephones, electronic book readers, desktop personal computers (PCs), laptop PCs, netbook computers, workstations, servers, a portable digital assistant (PDA), a portable multimedia player (PMP), an MP3 player, a medical device, a camera, or a wearable device. A wearable device may include any one or any combination of the accessory type (e.g., as a watch, a ring, a bracelet, a bracelet, a necklace, a pair of glasses, a contact lens or a head-mounted-device (HMD)); a fabric or a garment-embedded type (e.g., a skin pad or a tattoo); or a bio-implantable circuit. In some embodiments, the electronic apparatus may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

The memory 110 may be implemented as an internal memory such as a read-only memory (ROM), such as electrically erasable programmable read-only memory (EEPROM), and a random-access memory (RAM) or a memory separate from the processor 120. In this case, the memory 110 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

The memory 110 may store an input image. The input image may include a plurality of frames.

The memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory, such as one time programmable ROM (OTPROM), programmable ROM (PROM), erasable and programmable ROM (EPROM), electrically erasable and programmable ROM (EEPROM), mask ROM, flash ROM, a flash memory, such as NAND flash or NOR flash), a hard disk drive (HDD) or a solid state drive (SSD). In the case of a memory detachably mounted to the electronic apparatus 100, the memory may be implemented as a memory card, such as a compact flash (CF), secure digital (SD), micro secure digital (micro-SD), mini secure digital (mini-SD), extreme digital (xD), or multi-media card (MMC), and an external memory, such as a universal serial bus (USB) memory connectable to the USB port.

The processor 120 may perform an overall control operation of the remote controller 100. The processor 120 may perform a function to control overall operations of the electronic apparatus 100.

The processor 120 may be implemented with at least one of a digital signal processor (DSP), a microprocessor, and a time controller (TCON). The processor 120 is not limited thereto and may include at least one or more of a central processing unit (CPU), a micro controller unit (MCU), a micro processing unit, a controller, an application processor (AP), a communication processor (CP), and an advanced reduced instruction set computing (RISC) machine (ARM) processor or may be defined as a corresponding term. The processor 120 may be implemented in a system on chip (SoC) type or a large scale integration (LSI) type in which a processing algorithm is built therein or in a field programmable gate array (FPGA) type. The processor 120 may perform various functions by executing computer executable instructions stored in a memory.

The processor 120 may obtain two consecutive frames of the input image, as input frames, wherein the two consecutive frames correspond to a first frame and a second frame preceding the first frame. The processor 120 may obtain a first interpolation frame of the input frames and a first confidence corresponding to the first interpolation frame based on a first interpolation method. The processor 120 may obtain a second interpolation frame of the input frames and a second confidence corresponding to the second interpolation frame based on a second interpolation method that is different from the first interpolation method. The processor 120 may use the first confidence and the second confidence as evaluation results of the accuracy of the first interpolation frame and the second interpolation frame, respectively. The processor 120 may obtain weights corresponding to each of the first interpolation frame and the second interpolation frame based on the first confidence and the second confidence, and obtain an output image based on the obtained weight. The weights may be used to adjust pixel values of the first interpolation frame and the second interpolation frame, and may be also referred to as pixel value adjustment parameters.

The input image refers to an image (e.g., a video) stored in a memory 110 or a live streaming video, and the input image may include a plurality of frames. The first frame refers to a current frame, and the second frame may refer to a previous frame. The reference of the previous frame may be changed according to the user's setting, and if the reference of the previous frame is one (1) second, the first frame may be a frame reproduced at 3 second and the second frame may be a frame reproduced at 2 second. The processor 120 may obtain a current frame (a first frame) and a previous frame (second frame) as much as a predetermined time (e.g., 1 second).

The first interpolation method and the second interpolation method may be any one of a block-based interpolation method, a differentiation-based interpolation method, or a deep learning-based interpolation method. However, the embodiment is not limited thereto, and various interpolation methods may be applied. A description of each interpolation method will be described later with reference to FIGS. 3 and 4.

The first interpolation method and the second interpolation method may be different interpolation methods.

The processor 120 may obtain the first interpolation frame based on the first interpolation method. The processor 120 may obtain the second interpolation frame based on the second interpolation method. An interpolation frame may refer to a frame to be added between the first frame and the second frame, to provide a smoother video processing result. The terms "first" and "second" in the "first interpolation frame" and the "second interpolation frame" may be used to differentiate interpolation frames that are generated using different interpolation methods.

The processor 120 may obtain the first confidence and the second confidence. The first confidence may refer to the confidence corresponding to the first interpolation frame obtained by the first interpolation method, and the second confidence may refer to the confidence corresponding to the second interpolation frame obtained by the second interpolation method.

The confidence may be information indicating how the interpolation frame (for example, that is generated by a decoder) matches an original frame (e.g., that is included in an encoding target image, between the first frame and the second frame, but is omitted in an encoded image which is obtained as a result of encoding the encoding target image). The confidence may be expressed as a likelihood that the interpolation frame matches an original frame, or accuracy or similarity between the interpolation frame and the original frame.

The confidence according to an embodiment may be a likelihood or a percentage of the match between the interpolation frame and the original frame, and the processor 120 may obtain confidence in order to identify how much an interpolation frame, which is an intermediate frame of the first frame and the second frame, matches the original frame. The higher the confidence, the more the interpolation frame would match the original frame, and the lower the confidence, the more the interpolation frame would not match the original frame.

The confidence according to another embodiment may refer to accuracy of a motion estimation result of a motion that occurs between the first frame and the second frame. The accuracy of the motion estimation result may refer to the accuracy of the motion vector. The processor 120 may calculate a motion estimation result based on the first frame and the second frame, and may use the calculated accuracy of the motion estimation result as the confidence. The processor 120 may compare each of a motion vector of the first frame and a motion vector of the second frame, with a motion vector of the interpolation frame, to determine the motion vector of the interpolation frame follows a transition path from the motion vector of the first frame to the motion vector of the second frame.

The original frames may refer to either of or both the first frame and the second frame used for generating the interpolation frame.

The interpolation frame may be added between the first frame and the second frame to increase the frame of the image per unit time. Therefore, it may mean that the higher the confidence of the interpolation frame, the higher the performance of the interpolation method, and the satisfaction of the user and the quality of the image may be improved.

The processor 120 may generate a combined interpolation frame based on the first confidence and the second confidence. The combined interpolation frame may mean a frame in which the first frame and the second frame are coupled. The first frame may be a frame obtained based on a first interpolation method and the second frame may be a frame obtained based on a second interpolation method. Accordingly, the combined interpolation frame may be a frame into which respective frames obtained based on different interpolation methods are combined. Combining different interpolation methods rather than using one interpolation method may offer an advantage of compensating for shortcomings of individual interpolation methods.

The processor 120 may use the first confidence and the second confidence as a weight to generate a combined interpolation frame. The processor 120 may obtain a first weight corresponding to the first interpolation frame and a second weight corresponding to the second interpolation frame based on the first confidence and the second confidence.

The first weight may mean the ratio of the first confidence to the overall confidence, and the second weight may mean the ratio of the second confidence to the overall confidence. The overall confidence may mean the sum of the first confidence and the second confidence. The first weight and the second weight will be described later in FIG. 7A. In Equation 710, the first weight may be $CA(x,y)/(CA(x,y)+CB(x,y))$, and the second weight may be $CB(x,y)/(CA(x,y)+CB(x,y))$.

The processor 120 may generate (or obtain) the combined interpolation frame by combining the first interpolation frame and the second interpolation frame based on the first weight and the second weight. The processor 120 may generate (or obtain) an output image based on the first frame, the second frame, and the combined interpolation frame. The output image may be an image reproduced in an order of the second frame, a combined interpolation frame, and the first frame.

The processor 120 may obtain a first motion vector corresponding to the input frames based on the first interpolation method, and obtain the first interpolation frame corresponding to the first motion vector based on the first interpolation method. The processor 120 may obtain a second motion vector corresponding to the input frames based on the second interpolation method, and obtain the second interpolation frame corresponding to the second motion vector based on the second interpolation method. The processor 120 may obtain a combined interpolation frame based on the first interpolation frame and the second interpolation frame, and obtain the output image based on the first frame, the second frame, and the combined interpolation frame.

The processor 120 may obtain the first motion vector based on the first interpolation method. The processor 120 may compare the first frame and the second frame based on a first interpolation method, and obtain a first motion vector based on a comparison result of the first frame and the second frame. A method of obtaining a motion vector may vary. For example, the motion vector may be obtained based on at least one of a block-based motion estimation (ME), a differentiation-based optical flow, or a machine learning or deep learning-based optical flow.

The processor 120 may obtain the first interpolation frame based on the first motion vector. The first interpolation frame may refer to a frame to be added between the first frame and the second frame. The first interpolation frame may be obtained based on a first interpolation method.

The processor 120 may obtain a second motion vector based on a second interpolation method different from the first interpolation method. The processor 120 may compare the first frame and the second frame based on the second interpolation method, and obtain a second motion vector based on a comparison result of the first frame and the second frame.

The processor 120 may obtain a second interpolation frame based on the obtained second motion vector. The second interpolation frame may be added between the first frame and the second frame, as an intermediate frame. The second interpolation frame may be obtained based on the second interpolation method.

The processor 120 may obtain (or generate) a combined interpolation frame based on the first interpolation frame and the second interpolation frame. In obtaining the combined interpolation frame, the processor 120 may use the first confidence corresponding to the first interpolation frame and the second confidence corresponding to the second interpolation frame. The processor 120 may obtain a first weight and a second weight based on the first confidence and the second confidence, and may determine a combination ratio of the first interpolation frame and the second interpolation frame based on the first weight and the second weight.

The first weight may mean a ratio in which the first interpolation frame is reflected in generating the combined interpolation frame (e.g., a ratio of a number of pixels of the first interpolation frames that are used in generating the combined interpolation frame, to a total number of pixels of the combined interpolation frame), and the second weight may mean a ratio in which the second interpolation frame is reflected when generating the combined interpolation frame (e.g., a ratio of a number of pixels of the second interpolation frames that are used in generating the combined interpolation frame, to a total number of pixels of the combined interpolation frame).

The processor 120 may obtain an output image based on the first frame, the second frame, and the combined interpolation frame. The output image may be an image reproduced in an order of the second frame, the combined interpolation frame, and the first frame.

A specific description will be provided with reference to FIGS. 5, 6, 16, and 17.

The processor 120 may obtain the first confidence based on at least one of the first motion vector or the first interpolation frame, and may obtain the second confidence based on at least one of the second motion vector or the second interpolation frame.

The processor 120 may obtain the first confidence based on the first interpolation method and may obtain the second confidence based on the second interpolation method.

Each confidence may be obtained based on at least one of a motion vector or an interpolation frame. For example, the processor 120 may obtain confidence using the motion vector, and in another example, the processor 120 may obtain confidence using the interpolation frame, and in another example, the processor 120 may obtain confidence using both the motion vector and the interpolation frame.

According to an embodiment, the confidence may refer to likelihood, and the first confidence may refer to information indicating how similar the first interpolation frame is to the original frames (the first frame and the second frame), and the second confidence may refer to information indicating how similar the second interpolation frame is to the original frames (the first frame and the second frame).

According to another embodiment, the confidence may mean accuracy, and the confidence may mean the accuracy of the motion vector obtained based on the original frame (the first frame and the second frame). The first confidence may mean the accuracy of the first motion vector obtained based on the first interpolation method, and the second confidence may mean the accuracy of the second motion vector obtained based on the second interpolation method.

The electronic apparatus 100 may obtain confidence based on at least one of a matching error, smoothness (or smoothness degree) of a motion vector field or an optical flow field, an error between warping images. The confidence may be calculated in a variety of ways, and the disclosure does not limit confidence calculations in a particular manner.

The matching error may mean an inter-block matching cost function calculated in the block-based ME process, and may be a method of providing higher confidence for a lower function value of the matching cost. For calculating matching error, various technologies may be used, including Sum of Absolute Differences (SAD), Sum of Squared Differences (SSD), Normalized Cross Correlation (NCC), and the like. The most basic form may calculate the confidence of the interval [0, 1] in the form of 1/(1+alpha*err).

A method of utilizing the smoothness of a motion vector field or an optical flow field may be performed under the assumption that a true motion vector field has a smooth feature in a general image. The electronic apparatus 100 may identify that the accuracy is higher as the motion vector field or the optical flow field is smoother and may assign high confidence. Since the smoothness has an inverse correlation with the average of the size of gradient or local variance of the pixels (or peripheral fields of the block position) to be computed, these values may be defined as unsmoothness (or unsmoothness degree). The electronic apparatus 100 may calculate confidence in the form of 1/(1+beta*unsmoothness).

The error between the warping images may provide information about how much the warped image match each other, based on the frame interpolation time point using each prediction result when the motion prediction is performed separately in the forward and backward directions. For example, when interpolating an intermediate frame of a previous frame and a present frame, the electronic apparatus 100 may compare a forward intermediate frame warped using a previous frame and a forward field and a backward intermediate frame warped using a current frame and a reverse field. Here, the more the two warped intermediate frames match each other, the higher the confidence, so the electronic apparatus 100 may calculate the same position matching error between the warping frames, thereby obtaining confidence.

In order to obtain the final confidence, the electronic apparatus 100 may use various types of calculations, such as multiplication or weighted sum, by utilizing the various confidence values obtained above to obtain the final confidence.

Although the first interpolation method and the second interpolation method have been described as different methods in the above-described embodiment, both the first interpolation method and the second interpolation method have the same motion vector acquisition operation, the interpolation frame acquisition operation, and the confidence acquisition operation. However, the second interpolation method according to another embodiment may further include a down-sampling operation and an up-sampling operation. A second interpolation method according to another embodiment will be described below.

The processor 120 may obtain down-sampled frames of the input frames based on the second interpolation method, obtain a second motion vector corresponding to the obtained down-sampled frames. The processor 120 may obtain an up-sampled frame of the second interpolation frame based on the second interpolation method, and obtain a combined interpolation frame based on an up-sampled frame of the first interpolation frame and an up-sampled frame of the second interpolation frame.

The second interpolation method may further include a down-sampling operation in addition to the first interpolation method. Specifically, the second interpolation method may be a method for generating an interpolation frame based on data obtained by changing resolution to be low. The reason for performing down-sampling is to reduce the data throughput and shorten the processing speed.

The processor 120 may obtain down-sampled frames of the input frames. Here, the down-sampled frames may include a down-sampled first frame and a down-sampled second frame. The processor 120 may obtain a second motion vector based on the down-sampled first frame and the down-sampled second frame. The processor 120 may obtain the second interpolation frame based on the second motion vector. The processor 120 may obtain the second interpolation frame using the second interpolation method. Since the second interpolation frame is obtained after the down-sampling operation, the second interpolation frame may have lower resolution than the original data (the first frame and the second frame of the input image).

Accordingly, the processor 120 may perform an up-sampling operation to convert the original data to a resolution suitable for the original data. Here, the up-sampling operation may be also referred to as an up-scaling operation. The processor 120 may up-sample the second interpolation frame to obtain an up-sampled frame corresponding to the second interpolation frame. The up-sampled frame corresponding to the second interpolation frame may be expressed as an up-sampled second interpolation frame. The up-sampled frame corresponding to the second interpolation frame may have the same resolution as the original data.

The processor 120 may obtain a combined interpolation frame based on the first interpolation frame and the up-sampled second interpolation frame. Specifically, the processor 120 may obtain a first confidence corresponding to the first interpolation frame and obtain a second confidence corresponding to the up-sampled second interpolation frame. The processor 120 may obtain a first weight and a second weight based on the first confidence and the second confidence. The processor 120 may obtain a combined interpolation frame in which the first interpolation frame and the up-sampled second interpolation frame are reflected based on the first weight and the second weight.

A specific description will be given with reference to FIGS. 8 and 9.

The processor 120 may identify an area in which a degree of motion is greater than or equal to a threshold value based on the first frame and the second frame, and obtain down-sampled frames of the input frames by down-sampling the identified area.

An area in the input image where the degree of motion is greater than or equal to a threshold value may be expressed as a target area. The processor 120 may set an area in which motion is mainly identified in the input image to a target area. The processor 120 may perform an interpolation operation on the target area. Performing an interpolation operation with respect to the target area than performing the interpolation technology in all areas may be a more efficient method.

The processor 120 may identify an area in which the degree of motion is greater than or equal to a threshold value based on the first frame and the second frame as the target area. The target area may be an entire area or a partial area of the frame. The processor 120 may down-sample the identified target areas of each of the first frame and the second frame. The processor 120 may down-sample the target area of the first frame and down-sample the target area of the second frame.

According to an embodiment, the processor 120 may use a first interpolation method to identify an area where the degree of motion is greater than or equal to a threshold value. Specifically, the processor 120 may obtain a first motion vector through the first interpolation method and identify a target area based on the first motion vector.

According to another embodiment, the processor 120 may use a second interpolation method to identify an area where the degree of motion is greater than or equal to a threshold value. To identify the target area through the second interpolation method, the processor 120 may obtain the second motion vector. The processor 120 may identify the target area based on the obtained second motion vector, and the identified target area may be applied in the next frame. For example, a frame at 1 second may generate a second interpolated frame without applying a target area, and apply a target area from a frame at 2 seconds to generate a second interpolation frame.

Even if the degree of motion is greater than or equal to a threshold value, the processor 120 may additionally determine whether to perform a down-sampling operation on the target area based on the second interpolation method, based on the size of the area that may be processed by the second interpolation method. For example, even if the degree of motion is greater than or equal to a threshold value, processing may be performed by the second interpolation method. The processor 120 may compare the size of the target area where the predetermined size (the processable size by the second interpolation method) and the degree of motion are greater than or equal to the threshold value. Thus, if the size of the target area is less than the predetermined size, the processor 120 may not perform a down-sampling operation. If the size of the target area is greater than a predetermined size, the processor 120 may perform a down-sampling operation. If the down-sampling operation is not performed, the up-sampling operation may not be performed either.

The processor 120 may obtain a second interpolation frame based on a target area of the down-sampled first frame and a target area of the down-sampled second frame. The processor 120 may obtain the second interpolation frame based on the second interpolation method. The second interpolation frame may refer to a frame corresponding to a target area.

The processor 120 may up-sample the second interpolation frame again. Since the second interpolation frame is generated based on the target area, the up-sampling operation may be performed with respect to the target area.

The processor 120 may obtain a combined interpolation frame based on the first interpolation frame and the up-sampled second interpolation frame. The processor 120 may obtain an output image based on the first frame, the second frame, and the combined interpolation frame.

A specific description will be given with respect to FIGS. 10 and 11.

The processor 120 may obtain a first weight corresponding to the first interpolation frame and a second weight corresponding to the second interpolation frame based on the first confidence and the second confidence, and obtain an output image in which the first interpolation frame and the second interpolation frame are combined based on the first weight and the second weight.

The processor 120 may obtain a first weight corresponding to the first interpolation frame based on the first confidence and the second confidence. The processor 120 may obtain a second weight corresponding to the second interpolation frame based on the first confidence and the second confidence.

The first weight may mean the ratio of the first confidence to the overall confidence, and the second weight may mean the ratio of the second confidence to the overall confidence. The overall confidence may mean the sum of the first confidence and the second confidence. The first weight and the second weight will be described later in FIG. 7A. In Equation 710, the first weight may be $CA(x,y)/(CA(x,y)+CB(x,y))$, and the second weight may be $CB(x,y)/(CA(x,y)+CB(x,y))$.

The processor 120 may determine a combination ratio of the first interpolation frame based on the first weight and determine a combination ratio of the second interpolation frame based on the second weight. The processor 120 may combine the first interpolation frame and the second interpolation frame based on the determined combination ratio to obtain a combined interpolation frame. The processor 120 may obtain an output image based on the first frame, the second frame, and the combined interpolation frame.

The processor 120 may obtain the first confidence and the second confidence corresponding to pixels of the first interpolation frame and the second interpolation frame, respectively. The processor 120 may obtain weights corresponding to each of pixel areas included in the first interpolation frame and the second interpolation, respectively, based on the first confidence and the second confidence. The processor 120 may obtain the output image by applying the obtained weights to the obtained pixel areas, respectively.

The processor 120 may obtain the confidence for respective pixels of the frame. For example, the processor 120 may obtain a first confidence for respective pixels of the first interpolation frame and obtain a second confidence for respective pixels of the second interpolation frame. The processor 120 may obtain a first weight corresponding to respective pixels of the first interpolation frame and a second weight corresponding to respective pixels of the second interpolation frame based on the first confidence and the second confidence corresponding to respective pixels. The processor 120 may obtain a combined interpolation frame in which the first interpolation frame and the second interpolation frame are reflected based on the first weight corresponding to respective pixels and a second weight corresponding to respective pixels. The processor 120 may obtain an output image based on the first frame, the second frame, and the combined interpolation frame.

The processor 120 may obtain the first confidence and the second confidence corresponding to pixels of the first interpolation frame and the second interpolation frame, respectively, obtain weights corresponding to each of pixel areas included in the first interpolation frame and the second interpolation, respectively, based on the first confidence and the second confidence, and obtain the output image by applying the obtained weights to the obtained pixel areas, respectively, and the pixel area may be an area including a plurality of pixels.

The processor 120 may identify the pixel area after obtaining the confidence for respective pixels of the frame. The processor 120 may obtain a confidence average corresponding to the identified pixel area. The processor 120 may obtain a first weight value corresponding to a pixel area of the first interpolation frame using a first confidence average corresponding to the pixel area. The processor 120 may obtain a second weight value corresponding to a pixel area of the second interpolation frame using a second confidence average corresponding to the pixel area. The processor 120 may obtain a combined interpolation frame in which the first interpolation frame and the second interpolation frame are reflected based on the first weight and the second weight. The processor 120 may obtain an output image based on the first frame, the second frame, and the combined interpolation frame.

The pixel area may refer to an area in which a specific area is grouped, and may include a plurality of pixels. The processor 120 may calculate a confidence average corresponding to the pixel area, and the same weight may be applied to all pixels included in the pixel area.

For example, the processor 120 may apply a first weight to all pixels included in the pixel area of the first interpolation frame and apply a second weight to all pixels included in the pixel area of the second interpolation frame. The processor 120 may obtain a combined interpolation frame in which the first interpolation frame and the second interpolation frame are reflected based on the first weight and the second weight. The processor 120 may obtain an output image based on the first frame, the second frame, and the combined interpolation frame.

When a weight corresponding to each of the pixels is obtained, the data processing speed may be slow. However, when a weight corresponding to the pixel area is obtained, the data processing speed may be fast. Accordingly, it is possible to reduce the data processing speed by generating a combined interpolation frame using a weight corresponding to pixel areas rather than by generating a combined interpolation frame using a weight corresponding to respective pixels.

The processor 120, based on the likelihood (or accuracy) of the first confidence and the second confidence being less than a threshold, may obtain an output image based on the second interpolation frame.

The processor 120 may identify the resolution difference between the first interpolation method and the second interpolation method. For example, if it is assumed that the down-sampling operation is performed by the second interpolation method, it is possible to identify that the resolution of the second interpolation method is low. If the down-sampling operation is performed in the second interpolation method, the resolution of the first interpolation method and the second interpolation method may be different, and the resolution of the first interpolation method may be higher than that of the second interpolation method. If the down-sampling operation is not performed in the second interpolation method, the resolution of the first interpolation method and the resolution of the second interpolation method may be the same. Here, different resolution may mean that an operation of obtaining the first confidence is different from the operation of obtaining the second confidence, and finally, the up-sampling operation is performed in the second interpolation method and thus, in the combination operation in the output image, the first interpolation frame and the second interpolation frame having the same resolution may be used.

According to an embodiment, when the resolution of the first interpolation method and the second interpolation method is the same, the processor 120 may determine the output image generation method based on the pre-determine threshold value.

If both the first confidence and the second confidence are greater than or equal to a predetermined threshold value, the processor 120 may generate the output image by combining the first interpolation frame and the second interpolation frame.

If only one of the first confidence or the second confidence is equal to or greater than a predetermined threshold value, the processor 120 may generate an output image using only an interpolation frame corresponding to the confidence that is greater than or equal to a threshold value. For example, if the first confidence is 10, the second confidence is 20, and the predetermined threshold is 15, the processor 120 may generate the output image using only the second interpolation frame corresponding to the second confidence.

When both the first confidence and the second confidence are less than a predetermined threshold, the processor 120 may generate an output image using only the second interpolation frame, because the second interpolation method uses deep learning, and may generate a higher quality output image.

According to another embodiment, when the resolutions of the first interpolation method and the second interpolation method are different (in the case of performing the down-sampling operation in the second interpolation mode), the processor 120 may determine the output image generation method based on the predetermined threshold value.

If both the first confidence and the second confidence are equal to or greater than a predetermined threshold value, the processor 120 may generate an output image using only the first interpolation frame. When both the first confidence and the second confidence exceed a predetermined threshold value, it is possible to generate an output image having excellent quality, since the first interpolation frame in which the interpolation operation is performed at a high resolution may be used.

If only one of the first confidence or the second confidence is equal to or greater than a predetermined threshold value, the processor 120 may generate an output image using only an interpolation frame corresponding to a confidence that is greater than or equal to a threshold value.

If both the first confidence and the second confidence is less than a predetermined threshold value, the processor 120 may generate an output image using only the second interpolation frame.

An example where the output image generation methods are different depending on whether there is a resolution difference in respective interpolation methods at a time of obtaining the first confidence and the second confidence may be a situation in which both the first confidence and the second confidence exceed a predetermined threshold value. The first interpolation method may be block-based interpolation method, and the second interpolation method may be a deep learning-based interpolation method.

The electronic apparatus 100 may improve system performance by a forming hybrid-type system of combining several frame interpolation systems in a real time frame interpolation device.

The electronic apparatus 100 enables real-time high resolution processing by applying different resolutions in configuring a hybrid system, thereby reducing the processing amount of the entire system.

The electronic apparatus 100 may be implemented as a hybrid frame interpolation system that improves performance using several frame interpolation systems. Such a method may combine the advantages of frame interpolation systems with different features. In implementing a real-time high-resolution frame interpolation system, a block-based motion vector generation module, a differentiation-based motion vector generation module, a high-resolution frame interpolation system using a block-based interpolation frame generation module, and a low-resolution frame interpolation system using deep learning may be implemented in a hybrid form. Hybrid forms may use each advantage to improve the performance of the system and at the same time may reduce the complexity of the deep learning-based frame interpolation system which is complex and has a lot of processing. The hybrid type may be implemented as a deep learning-based real-time frame interpolation system applicable to consumer appliances such as a television (TV).

The electronic apparatus 100 may implement a deep learning-based real-time frame interpolation system which is applicable to a consumer appliance such as a TV by reducing the calculation amount of a deep learning-based frame interpolation system, which is complex and has a lot of processing, while improving the performance of the entire system by implementing an interpolation system in a hybrid form.

The electronic apparatus 100 may calculate confidence for respective pixels included in the interpolation frame. The electronic apparatus 100 may obtain a weight in consideration of a first confidence and a second confidence corresponding to each pixel, and may repeat a process of combining the first interpolation frame and the second interpolation frame through the obtained weight. The method of obtaining confidence for respective pixels may result in a problem that the processing speed becomes slow. In order to address this, the electronic apparatus 100 may use a separate buffer. The electronic apparatus 100 may use a separate buffer other than the memory 110. The separate buffer may be used only as a role of storing confidence. The electronic apparatus 100 may obtain confidence and improve the processing speed using only a separate buffer in a calculation process using the confidence. In order to solve the problem that the processing speed is slow, the electronic apparatus 100 may adjust a calculation operation using confidence. For example, the electronic apparatus 100 may perform a calculation operation using confidence in a partial area in an initial step of generating an interpolation frame, and may perform a calculation operation using confidence in an entire area in the later stage of interpolation frame generation. As another example, the electronic apparatus 100 may obtain a weight by using confidence, and may limit a change in weight in an operation of combining the first interpolation frame and the second interpolation frame using a weight. The electronic apparatus 100 may control the weight so that a change in a weight according to a frame change is gentle up to a predetermined time or a predetermined frame.

The electronic apparatus 100 may not use confidence at the same level with respect to all frames of the input image, and may use confidence at different levels by dividing the same into an early, a middle, and a late stage.

Although only a simple configuration of the electronic apparatus 100 is shown and described above, various configurations may be additionally provided during implementation. This will be described below with reference to FIG. 2.

Figure 2:
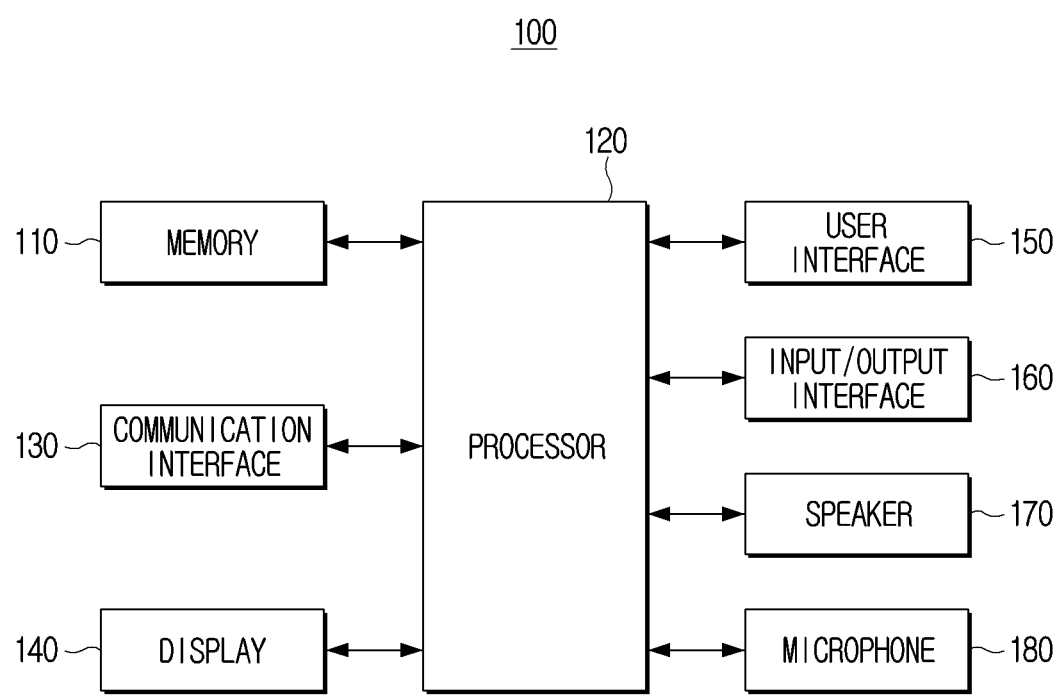
FIG. 2 is a block diagram illustrating a specific configuration of the electronic apparatus of FIG. 1.

FIG. 2 is a block diagram illustrating a specific configuration of the electronic apparatus of FIG. 1.

Referring to FIG. 2, the electronic apparatus 100 includes the memory 110, the processor 120, the communication interface 130, the display 140, the user interface 150, the input/output interface 160, the speaker 170, and the microphone 180.

The same operation as that of the memory 110 and the processor 120 will not be further described to avoid redundancy.

The processor 120 may perform a graphic processing function (e.g., video processing function). For example, the processor 120 may generate a screen including various objects such as icons, images, text, and the like. Here, a calculator may calculate an attribute value such as a coordinate value, a shape, a size, and a color to be displayed by each object according to the layout of the screen based on the received control command. A renderer may generate display screens of various layouts including objects based on the attribute value calculated by the calculator. The processor 120 may perform various image processing such as at least one of decoding, scaling, noise filtering, frame rate conversion, resolution conversion, or the like, for the video data.

The processor 120 may perform audio processing for audio data. To be specific, the processor 120 may perform various audio processing such as decoding, scaling, noise filtering, for the audio data.

The communication interface 130 may perform communication with various types of external devices according to various types of communication methods. The communication interface 130 may include a Wi-Fi module, a Bluetooth module, an infrared ray communication module, a wireless communication module, or the like. Each communication module may be implemented as at least one hardware chip.

The Wi-Fi module and the Bluetooth module perform communication by the Wi-Fi method and Bluetooth method, respectively. When using the Wi-Fi module or the Bluetooth module, the various connection information such as the service set identifier (SSID) and the session key may be transceived first, and various information may be transceived after communication connection.

The infrared ray communication module performs communication according to infrared data association (IrDA) technology that transmits data wireless to local area using infrared ray between visible rays and millimeter waves.

The wireless communication module may include at least one chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods described above.

The communication interface 130 may include at least one of a local area network (LAN) module, Ethernet module, or wired communication module performing communication using a pair cable, a coaxial cable, an optical cable, an ultra-wide band (UWB) module, or the like.

According to an embodiment, the communication interface 130 may use the same communication module (for example, Wi-Fi module) to communicate with an external device such as a remote controller and an external server.

In accordance with another example, the communication interface 130 may utilize different communication modules (for example, Wi-Fi modules) to communicate with an external device such as a remote controller and an external server. For example, the communication interface 130 may use at least one of an Ethernet module or a Wi-Fi module to communicate with an external server, and may use a Bluetooth (BT) module to communicate with an external device such as a remote controller. However, this is merely exemplary, and the communication interface 130 may use at least one communication module among various communication modules when communicating with a plurality of external devices or an external server.

The display 140 includes a display panel to output an image. The display panel may be implemented as various types of panels such as a liquid crystal display (LCD) panel, organic light emitting diodes (OLED) display panel, a plasma display panel (PDP), and the like. The display 140 may include a driving circuit that may be implemented using one or more of an a-Si thin film transistor (TFT), a low temperature poly silicon (LTPS) TFT, an organic TFT (OTFT), and a backlight. Further, the display may be implemented as at least one of a touch screen coupled with a touch sensor, a flexible display, a three-dimensional (3D) display, or the like.

According to an embodiment, the display 140 may include not only a display panel to output an image but also a bezel that houses a display panel. In particular, the bezel according to an embodiment may include a touch sensor for sensing a user interaction.

The user interface 150 may be implemented using a device such as at least one of a button, a touch pad, a mouse, a keyboard, or a touch screen capable of performing the above-described display function and operation input function. Here, the button may be various types of buttons such as at least one of a mechanical button, a touch pad, a wheel, or the like, formed in an arbitrary area such as at least one of a front portion, a side portion, a back portion, or the like, of the outer surface of the main body of the electronic apparatus 100.

The input and output interface 160 may be one of the high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The input and output interface 160 may input and output at least one of an audio signal and a video signal.

According to an example, the input and output interface 160 may include a port to input and output only an audio signal or a port to input and output only a video signal as a separate port, or may be implemented as a port which input and output both the audio signal and the video signal.

The electronic apparatus 100 may include the speaker 170. The speaker 170 may be an element to output various audio data, various alarm sounds, a voice message, or the like, which are processed by the input and output interface.

The electronic apparatus 100 may further include the microphone 180. The microphone is an element to receive a user voice or other sound and convert to audio data.

The microphone 180 may receive the user voice in an active state. For example, the microphone 180 may be integrally formed as an integral unit on at least one of an upper side, a front side direction, a side direction, or the like of the electronic apparatus 100. The microphone 180 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

According to an embodiment, the electronic apparatus 100 may include a display and may display an image on a display.

According to another embodiment, the electronic apparatus 100 may be implemented in a form of a device that does not include a display or may only include a simple display for a notification or the like. The electronic apparatus 100 may be implemented in a form of transmitting an image to a separate display device through a video/audio output port or a communication interface.

The electronic apparatus 100 may include a port for simultaneously transmitting or receiving video and audio signals. According to another example, the electronic apparatus 100 may include a port that separately transmits or receives video and audio signals, respectively.

The interpolation operation may be performed by one of the electronic apparatus 100 or the external server. For example, an interpolation operation may be performed at an external server to generate an output image, and the electronic apparatus 100 may receive the output image from the external server and display the image.

As another example, the electronic apparatus 100 may perform direct interpolation operation to generate an output image and may display the generated output image.

As another example, the electronic apparatus 100 may perform a direct interpolation operation to generate an output image and transmit the generated output image to an external display device. The external display device may receive the output image from the electronic apparatus 100 and display the received output image.

The electronic apparatus 100 may further include a microphone 180. The microphone 180 is configured to receive user speech or other sounds and convert the user speech or other sounds to audio data.

The microphone 180 may receive the user voice in an active state. For example, the microphone 180 may be integrally formed as an integral unit on at least one of an upper side, a front side direction, a side direction, or the like of the electronic apparatus 100. The microphone 180 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The electronic apparatus 100 may receive a user speech signal from an external device including a microphone. In this example, the received user speech signal may be a digital speech signal, or may be an analog speech signal according to an implementation example. For example, the electronic apparatus 100 may receive a user speech signal through a wireless communication method such as Bluetooth or Wi-Fi. Here, the external device may be implemented as a remote control device or a smartphone.

The electronic apparatus 100 may transmit the speech signal to the external server to recognize the speech signal received from the external device.

A communication module for communicating with the external device and the external server may be implemented separately. For example, communication with the external device may be performed through a Bluetooth module, and communication with the external server may be performed through the Ethernet modem or the Wi-Fi module.

The electronic apparatus 100 according to an embodiment may transmit a received digital speech signal to a speech recognition server. In this case, the speech recognition server may convert the user input into text information using a speech to text (STT). The speech recognition server may transmit text information to another server or an electronic apparatus to perform a search corresponding to the text information, and in some cases, perform a direct search.

The electronic apparatus 100 according to another embodiment may apply a speech to text (STT) function directly to a user input to convert to text information, and transmit the converted text information to an external server.

According to another embodiment, the external device may be implemented with a smartphone including a microphone. The smartphone may remotely control the electronic apparatus 100 using a remote control application performing a pre-installed remote control function.

The smartphone may convert the analog speech signal into a digital speech signal when the analog speech signal of the user is received through the microphone. In this example, the smartphone may perform speech recognition on the digital speech signal using the speech recognition application. The speech recognition application may be the same as or different from the remote control application described above. When speech recognition for the digital speech signal is performed, the smartphone may be remotely controlled using the remote control application based on the speech recognition result. However, according to another embodiment, the smartphone may transmit the converted digital speech signal to the smartphone using at least one of infrared, Wi-Fi, or Bluetooth communication. In this case, when the digital speech signal is received from the external device, the smartphone may perform speech recognition based on the received digital speech signal and perform a control operation based on the speech recognition result.

Figure 3:
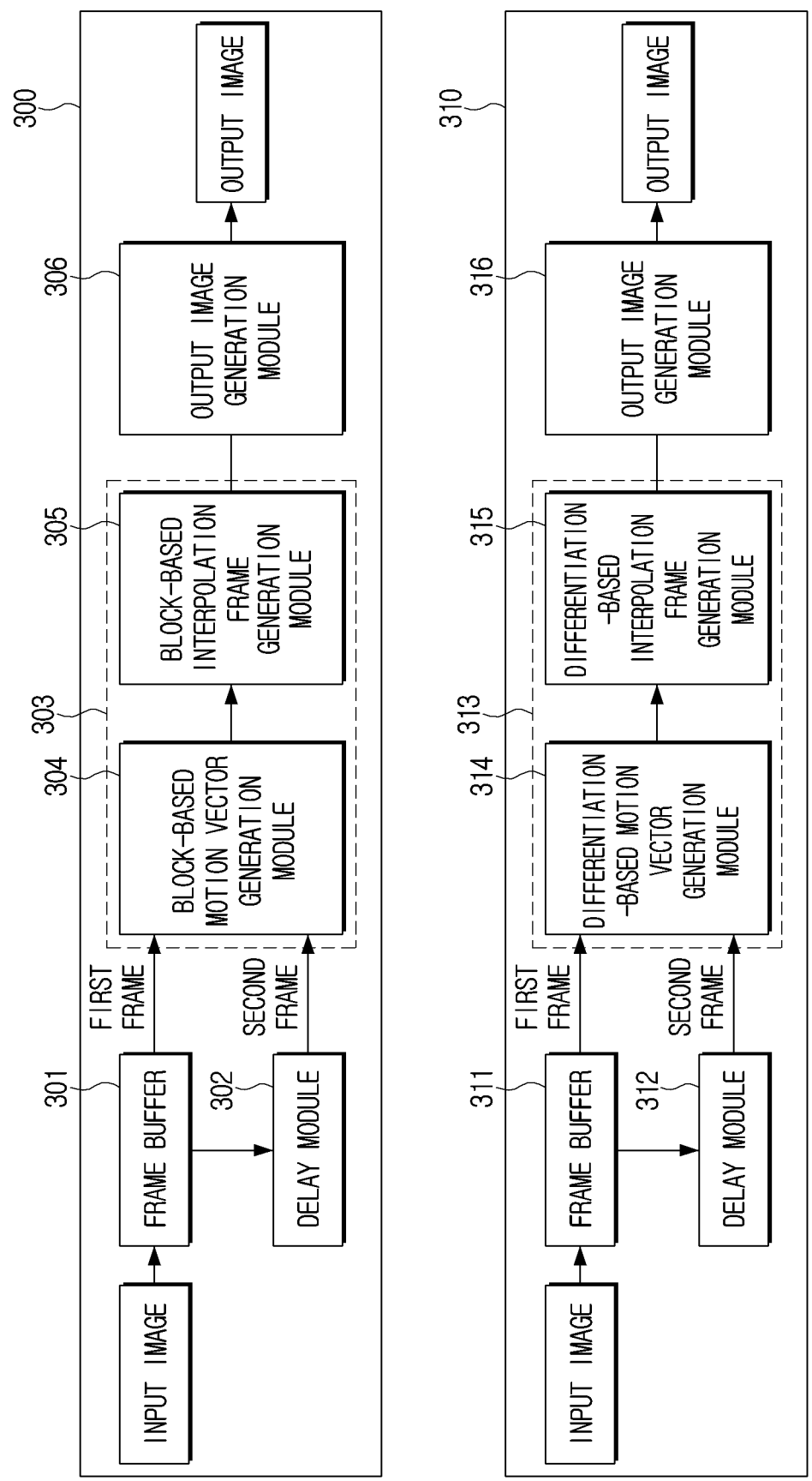
FIG. 3 is a diagram illustrating various methods of generating an output image using an interpolation frame.

FIG. 3 is a diagram illustrating various methods of generating an output image using an interpolation frame.

Referring to FIG. 3, the electronic apparatus 100 according to an embodiment (300) may generate an output image using a block-based interpolation method. The electronic apparatus 100 may receive an input image. The electronic apparatus 100 may store the received input image using a frame buffer 301. The electronic apparatus 100 may obtain a first frame and a second frame, which is a previous frame of the first frame, using a delay module 302. The first frame may be a current frame and the second frame may refer to a previous frame.

The electronic apparatus 100 may generate an interpolation frame using a block-based interpolation module 303. The block-based interpolation module 303 may include a block-based motion vector generation module 304 and a block-based interpolation frame generation module 305. The block-based motion vector generation module 304 may obtain a motion vector based on the first frame and the second frame. The block-based interpolation frame generation module 305 may generate an interpolation frame based on the obtained motion vector. The electronic apparatus 100 may generate an output image based on an output image generation module 306.

The block-based interpolation method may be a frame interpolation method using a block-based motion estimation (ME)/motion compensated frame interpolation (MCFI). The block-based ME may correspond to the block-based motion vector generation module 304, and the block-based MCFI may correspond to the block-based interpolation frame generation module 305.

The block-based interpolation method may be configured with the ME step of dividing an image into blocks having a predetermined size and predicting the motion of respective blocks in the image through block matching between a previous frame and a current frame, and generating an intermediate frame on the basis of the predicted motion.

The step of ME may have a forward method and a backward ME method. Here, the backward method may find a block in a previous frame in which a matching cost function is minimized for respective image blocks in the current frame, obtain the displacement as a motion vector (MV), and predict a motion vector field (MVF) for the entire image. The matching cost function may be generally composed of items reflecting likelihood among image blocks such as sum of absolute difference (SAD), sum of squared difference (SSD), normalized cross correlation (NCC), or the like, and items reflecting confidence of MVF such as smoothness constraint. In a general image, since adjacent blocks in an image belonging to the same object may have similar motion and thus, it is possible to reduce errors by having a smoothness constraint rather than predicting the MVF using only the inter-block likelihood.

There may be the following methods for selecting which blocks when combining (or matching) an image block between frames. The first method may be a method using a full search ME that performs matching for all block pairs. The first method is advantageous in that there is no error due to local minima in a cost minimization issue, but is disadvantageous in that a very large amount of computation is required and the speed is slow. The second method may be a method using an ME utilizing a step-wise search, such as a three-step search. The second method may be a method of reducing an amount of processing and increasing a search speed through a coarse to fine search technology. The third method may be a method of utilizing a high likelihood between adjacent MVs in the MVF, and may be a method of using a recursive ME selecting candidate MV from the MVs of the block adjacent to the time axis, and spatial axis to be predicted and searching for only the periphery. The third method may operate at a very fast speed by minimizing the amount of computation, but is disadvantageous in being vulnerable to a local minima problem. In a typical real-time frame interpolation system, it is possible to supplement disadvantages by combining various methods according to steps and situations rather than using any one of the above methods.

In the MCFI step, an intermediate frame may be generated by using the predicted motions by blocks. The most basic principle of generating an intermediate frame may be to project pixels of a previous frame and a current frame to an intermediate frame position using MV. With respect to respective pixels of the intermediate frame, several pixels may be projected from the previous frame and the current frame, and even one pixel is not projected, and thus is empty. In the case where several pixels are projected, various techniques such as simply averaging pixel values and reflecting pixel values using the confidence of each projected pixel may be used. In particular, in an occlusion area where an object disappears or appears, an optional pixel reflection may be greatly helpful to the quality of a resultant image. In addition, various methods may be used such as utilizing a simple method of using a filter and a complex inpainting technique to fill the empty portion because the pixel is not projected.

The electronic apparatus 100 according to another embodiment (310) may generate an output image using a differentiation-based method. Here, the frame buffer 311 and the delay module 312 may correspond to the frame buffer 301 and the delay module 302 described in the embodiment (300) and will not be further described.

The electronic apparatus 100 may generate an interpolation frame using the differentiation-based interpolation module 313. The differentiation-based interpolation module 313 may include a differentiation-based motion vector generation module 314 and a differentiation-based interpolation frame generation module 315. The differentiation-based motion vector generation module 314 may obtain a motion vector based on the first frame and the second frame. The interpolation frame generation module 315 may generate an interpolation frame based on the obtained motion vector. The electronic apparatus 100 may generate an output image based on the output image generation module 316.

The differentiation-based interpolation method may use an optical flow technique, and the optical flow technique may use luminance constancy condition. Here, the differentiation-based interpolation method may obtain a motion vector using the following relational equation 1.

$$I(x,y,t) = I(x + \text{delta } x, y + \text{delta } y, t + \text{delta } t) \quad \text{Relational equation 1}$$

Here, I may denote an image; x,y may denote a coordinate of a frame, and t may denote time.

The differentiation-based interpolation method may obtain the relational equation 2 below by developing the relational equation 1 above with a Taylor series and ignoring the higher order terms.

$$I(x + \text{delta } x, y + \text{delta } y, t + \text{delta } t) = I(x,y,t) + dI/dx * \text{delta } x + dI/dy * \text{delta } y + dI/dt * \text{delta } t + (\text{higher-order terms}) \quad \text{Relational equation 2}$$

Here, higher-order terms may denote that the higher-order terms of the Taylor series are to be omitted.

The differentiation-based interpolation method may finally obtain the relational equation 3 below by dividing both sides by delta t.

$$IxVx + IyVy = -It \quad \text{Relational equation 3}$$

Here, Ix may denote dI/dx, Iy may denote dI/dy, Vx may denote delta x/delta t, and Vy may denote delta y/delta t.

The differentiation-based interpolation method may obtain the motion vector based on the relational equation 3 described above.

Here, Vx may denote the motion vector of x coordinate and the table may refer to the motion vector of y coordinate.

Lukas-Kanade method may be used to solve the differential equation. Here, the Lukas-Kanade method may set a window including a corresponding pixel and a neighboring pixel with respect to the pixel for calculating flow, set a differential equation for the pixels in the window, and may solve the equation with a least square method.

In order to solve the differential equation, the Horn-Schunck method may be used to solve the differential equation. The Horn-Schunck method may be a method of defining an energy function that adds a smoothness term for an entire image, and then calculating a flow with a cost minimization technique.

The partial differentiation-based interpolation method may generate an output image by performing the frame interpolation in the similar manner as the block-based MCFI after the optical flow field is predicted.

Figure 4:
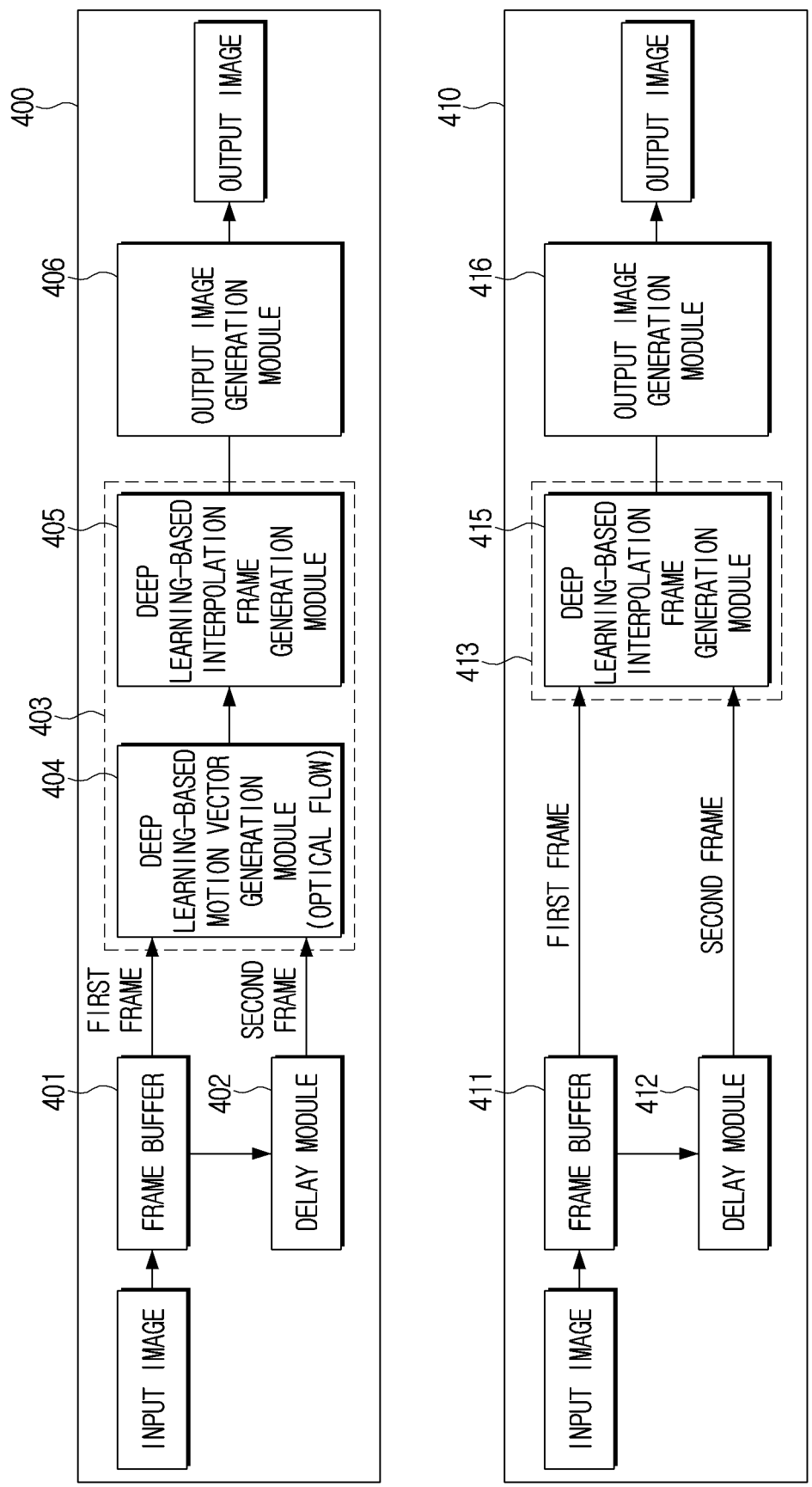
FIG. 4 is a diagram illustrating various methods of generating an output image using an interpolation frame.

FIG. 4 is a diagram illustrating various methods of generating an output image using an interpolation frame.

Referring to FIG. 4, the electronic apparatus 100 according to another embodiment 400 may generate an output image using a deep learning-based interpolation method. A frame buffer 401 and a delay module 402 may correspond to the frame buffer 301 and the delay module 302 described in one embodiment 300 and will not be further described.

The electronic apparatus 100 may also generate an interpolation frame using the deep learning-based interpolation module 403. The deep learning-based interpolation module 403 may include a deep learning-based motion vector generation module 404 and a block-based interpolation frame generation module 405. The deep learning-based motion vector generation module 404 may obtain a motion vector based on the first frame and the second frame. The block-based interpolation frame generation module 405 may generate an interpolation frame based on the obtained motion vector. The electronic apparatus 100 may generate an output image based on the output image generation module 406.

The frame interpolation method using deep learning is, in general, a method for training a system composed of a convolutional neural network (CNN) using an image database, and may be classified as a method of using an optical flow and a method not using the optical flow. First, a method using optical flow may interpolate a frame through three steps of optical flow calculation, image warping, and image synthesis.

In an optical flow calculation step, the flow map may be obtained for an input image, and the optical flow prediction network may be trained using an image database which is aware of true optical flow.

In the image warping step, each pixel in the image may be moved according to a desired point in time by using the previously predicted optical flow. The image warping step may generate a backward warping image obtained based on the backward flow and the current frame, and a forward warping image obtained based on the forward flow and the previous frame.

In the image synthesis step, a single output image may be generated from two warping images. Here, in each step, the performance of the entire system may be improved by utilizing additional input information such as various feature maps, etc.

The electronic apparatus 100 according to another embodiment 410 may generate an output image without a motion vector acquisition module differently from the embodiment 400. The frame buffer 411 and the delay module 412 may correspond to the frame buffer 301 and the delay module 302 described in one embodiment 300 and thus redundant description will be omitted.

The electronic apparatus 100 may obtain an interpolation frame of the input frames based on the machine learning or deep learning-based interpolation frame generation module 415. The electronic apparatus 100 may generate an output image based on the output image generation module 416.

The method that does not use an optical flow may omit all of the image warping steps using optical flow calculation and flow and may generate an intermediate frame directly from the input frames. Unlike the methods of using optical data flow which may have a difficulty in learning due to connection of networks having different structures, in the method of not using the optical flow the entire system, the entire system is composed of the single network and thus may be easy to train the system. However, the method in which optical flow is not used may increase the difficulty of learning due to the high complexity of the network to be trained.

Figure 5:
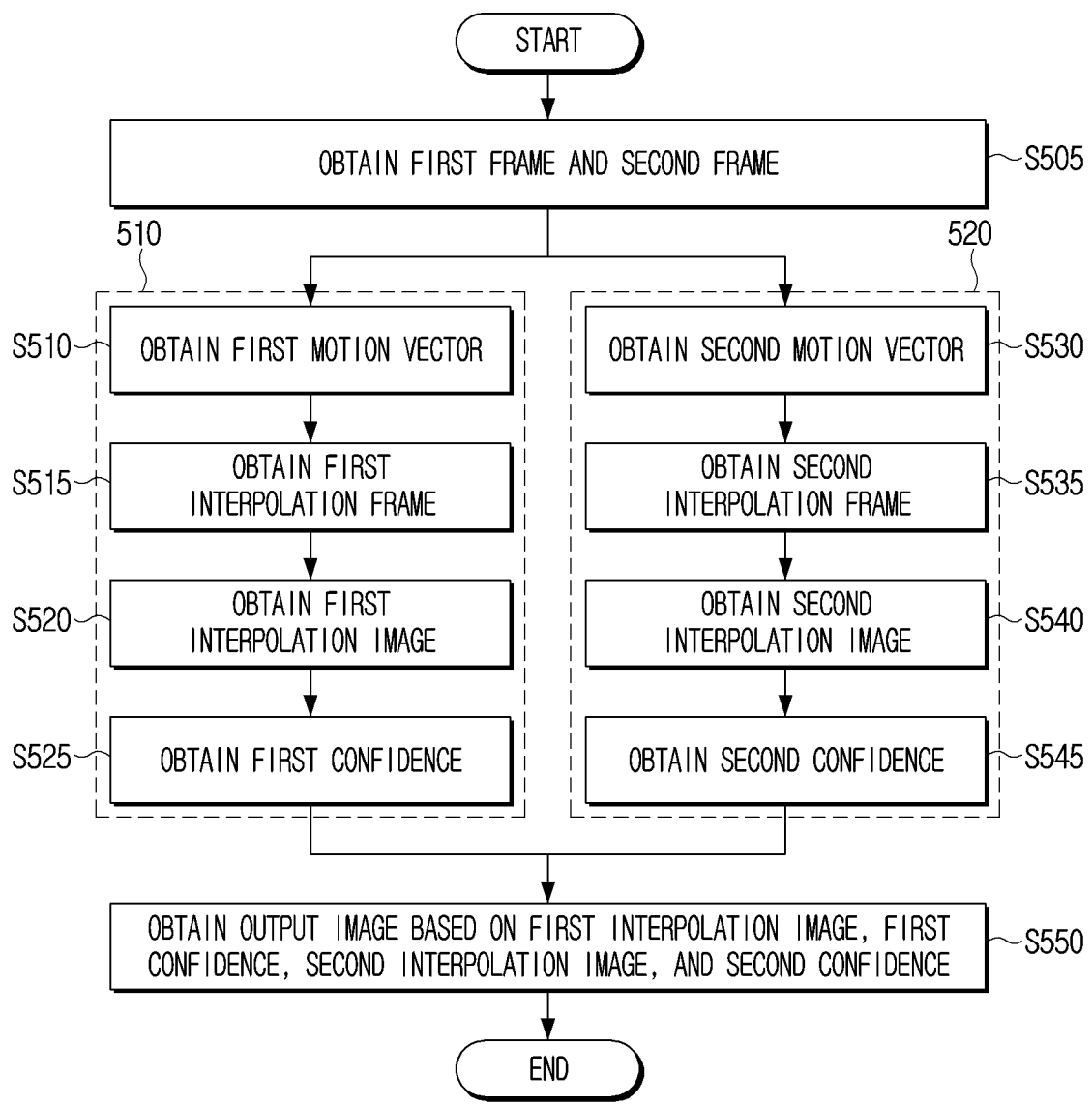
FIG. 5 is a flowchart illustrating an embodiment of combining an interpolation image that is obtained by using a plurality of interpolation methods according to an embodiment.

FIG. 5 is a flowchart illustrating an embodiment of combining an interpolation image that is obtained by using a plurality of interpolation methods according to an embodiment.

Referring to FIG. 5, the electronic apparatus 100 may obtain a first frame and a second frame in operation S505. Since the description of the first and second frames has been provided in detail with reference to FIG. 3, a detailed description thereof will be omitted.

The electronic apparatus 100 may obtain interpolation image and confidence corresponding to each interpolation module by using the first interpolation module 510 corresponding to the first interpolation method and the second interpolation module 520 corresponding to the second interpolation method.

The electronic apparatus 100 may obtain the first motion vector based on the first interpolation method in operation S510. Specifically, the electronic apparatus 100 may obtain a first motion vector corresponding to the input frames based on the motion vector generation module included in the first interpolation module 510.

The electronic apparatus 100 may obtain the first interpolation frame based on the first interpolation method in operation S515. The electronic apparatus 100 may obtain the first interpolation frame based on the interpolation frame generation module included in the first interpolation module 510.

The electronic apparatus 100 may obtain the first interpolation image based on the first frame, the second frame, and the first interpolation frame in operation S520. The electronic apparatus 100 may obtain a second interpolation image in the order of a first frame, a first interpolation frame, and a second frame.

The electronic apparatus 100 may obtain the first confidence based on at least one of the first motion vector, the first interpolation frame, or the first interpolation image in operation S525. Although step S525 is described as being performed after step S520, the operation of obtaining confidence may be performed immediately after step S510 or immediately after step S515.

The electronic apparatus 100 may obtain the second motion vector based on the second interpolation method in operation S530. The electronic apparatus 100 may obtain a second motion vector corresponding to the input frames based on the motion vector generation module included in the second interpolation module 520.

The electronic apparatus 100 may obtain the second interpolation frame based on the second motion vector in operation S535. The electronic apparatus 100 may obtain a second interpolation frame based on the interpolation frame generation module included in the second interpolation module 520.

The electronic apparatus 100 may obtain a second interpolation image based on the first frame, the second frame, and the second interpolation frame in operation S540. The electronic apparatus 100 may obtain the second interpolation image in the order of the first frame, the second interpolation frame, and the second frame.

The electronic apparatus 100 may obtain the second confidence based on at least one of the second motion vector, the second interpolation frame, or the second interpolation image in operation S545. Although steps S545 and S545 have been described as being performed after step S540, the operation of obtaining confidence may be performed immediately after step S530 or immediately after step S535.

The electronic apparatus 100 may obtain the output image based on the first interpolation image, the first confidence, the second interpolation image, and the second confidence in operation S550.

In the embodiment of FIG. 5, it is described that the interpolation image is generated in operation S520 and S540. However, according to an implementation example, a step in which an interpolation image is generated may be omitted. In step S550, the electronic apparatus 100 may generate a combined interpolation frame based on the first interpolation frame and the second interpolation frame, and generate an output image based on the first frame, the second frame, and the combined interpolation frame. The detailed description related thereto will be described later with reference to FIG. 17.

Figure 6:
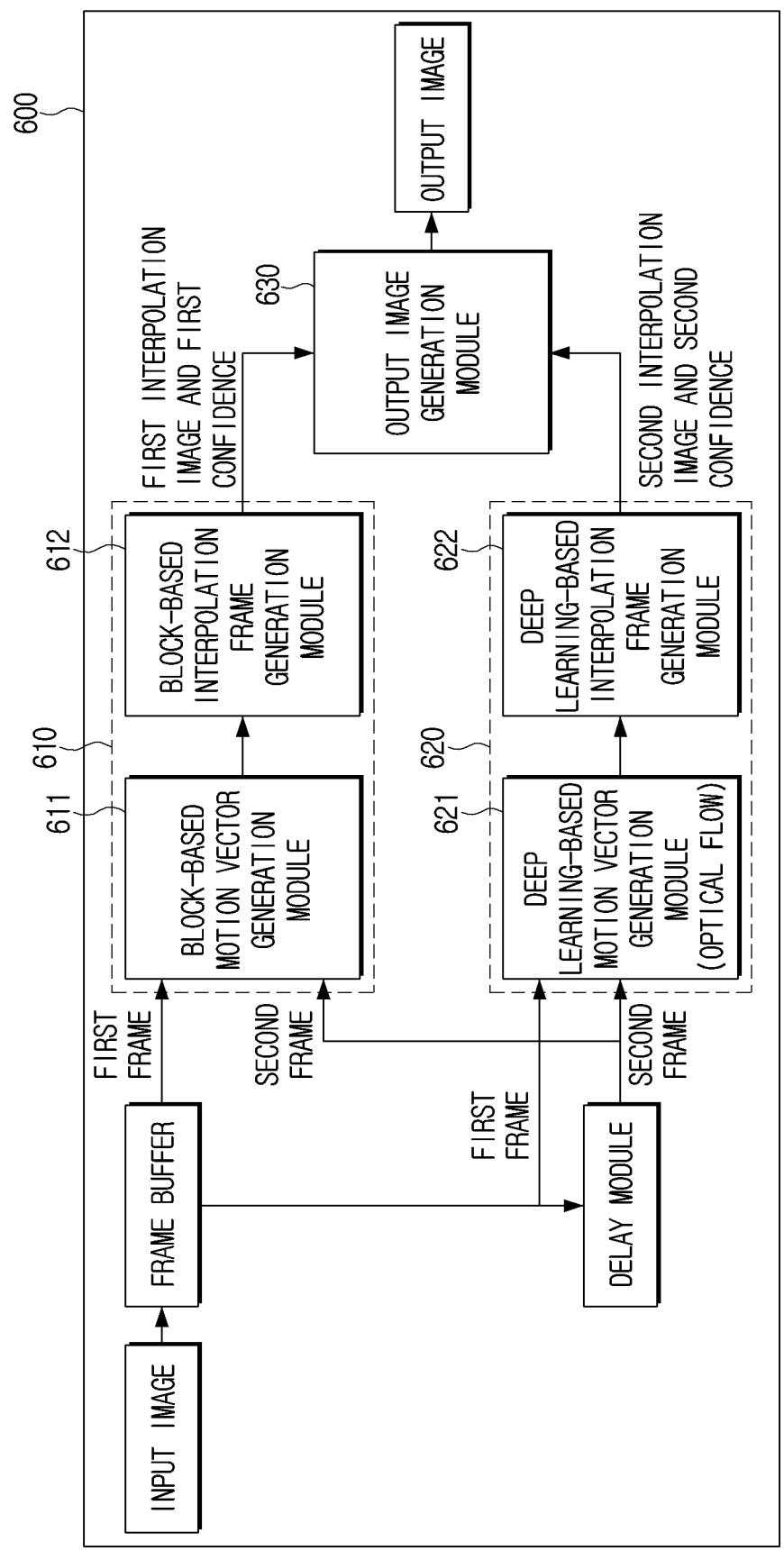
FIG. 6 is a diagram illustrating a specific operation of FIG. 5.

FIG. 6 is a diagram illustrating a specific operation of FIG. 5.

Referring to FIG. 6, according to an embodiment 600, the electronic apparatus 100 may receive an input image, and may obtain a first frame and a second frame, which is a previous frame of the first frame, using the frame buffer and the delay module. Since the operation related thereto has been described in FIG. 3, a redundant description will be omitted.

The electronic apparatus 100 may obtain the first interpolation image based on the first interpolation method and may obtain the second interpolation image based on the second interpolation method.

The first interpolation method may be a block-based interpolation method, and the second interpolation method may be a deep learning-based interpolation method. The first interpolation module 510 may be a block-based interpolation module 610, and the second interpolation module 520 may be a deep learning-based interpolation module 620.

The block-based interpolation module 610 may include a block-based motion vector generation module 611 and a block-based interpolation frame generation module 612. The deep learning-based interpolation module 620 may include a deep learning-based motion vector generation module 621 and a deep learning-based interpolation frame generation module 622.

The block-based motion vector generation module 611 may obtain the first frame and the second frame. The block-based motion vector generation module 611 may obtain a first motion vector based on the first frame and the second frame. The block-based motion vector generation module 611 may transmit the obtained first motion vector to the block-based interpolation frame generation module 612.

The block-based interpolation frame generation module 612 may generate the first interpolation frame based on the received first motion vector.

The block-based interpolation module 610 may add a first interpolation frame between the first frame and the second frame to generate a first interpolation image. The first interpolation image may be an image reproduced in the order of the second frame, the first interpolation frame, and the first frame. The first interpolation frame may be at least one frame and may be two or more frames.

The block-based interpolation module 610 may transmit the first interpolation image and the first confidence to the output image generation module 630.

The deep learning-based motion vector generation module 621 may obtain the first frame and the second frame. The deep learning-based motion vector generation module 621 may obtain a second motion vector based on the first frame and the second frame. The deep learning-based motion vector generation module 621 may transmit the obtained second motion vector to the deep learning-based interpolation frame generation module 622.

The deep learning-based interpolation frame generation module 622 may generate the first interpolation frame based on the second motion vector.

The deep learning-based interpolation module 620 may add a second interpolation frame between the first frame and the second frame to generate a second interpolated image. The second interpolation image may be an image reproduced in a second frame, a second interpolation frame, and a first frame order. The second interpolation frame may be at least one frame or may be two or more frames.

The deep learning-based interpolation module 620 may transmit the second interpolation image and the second confidence to the output image generation module 630.

The output image generation module 630 may generate an output image based on the first interpolation image received from the block-based interpolation module 610 and the second interpolation image and the second confidence received from the deep learning-based interpolation module 620.

FIG. 6 illustrates a hybrid frame interpolation system in which a block-based ME/MCFI system and a deep learning-based frame interpolation system corresponding to the deep learning-based interpolation module 620 are coupled. The final output image becomes a weighted sum of the interpolated images output from each system, and the weight of each interpolation image may be defined as the confidence of the corresponding image.

According to another embodiment, each system may be replaced with a frame interpolation system based on other techniques and each system may not utilize motion prediction techniques, such as block-based ME or differentiation-based optical prediction.

In the embodiment of FIG. 6, it is illustrated that the interpolation image is generated in the block-based interpolation module 610 and the deep learning-based interpolation module 620, but according to an implementation example, a step in which an interpolation image is generated may be omitted. The output image generation module 630 may generate a combined interpolation frame based on the first interpolation frame and the second interpolation frame, and generate an output image based on the first frame, the second frame, and the combined interpolation frame. The detailed description related thereto will be described later with reference to FIG. 16.

FIG. 7A is a diagram illustrating an embodiment of obtaining an output image based on first confidence and second confidence.

Referring to FIG. 7A, the electronic apparatus 100 may generate an output image in which a first interpolation image and a second interpolation image are combined. Based on the frame unit, the electronic apparatus 100 may combine the first interpolation frame and the second interpolation frame to generate an output frame. The electronic apparatus 100 may obtain a first confidence corresponding to the first interpolation frame and a second confidence corresponding to the second interpolation frame according to the coordinates, and combine the first interpolation frame and the second interpolation frame according to the obtained first confidence and the second confidence.

According to an embodiment, the electronic apparatus 100 may generate an output frame using confidence corresponding to each of the coordinates obtained by different interpolation methods. Here, the electronic apparatus 100 may use Equation 710.

The Equation 710 may be as follows:

$$IO(x,y) = \{CA(x,y)/(CA(x,y)+CB(x,y))\}*IA(x,y) + \{CB(x,y)/(CA(x,y)+CB(x,y))\}*IB(x,y)$$

$IO(x,y)$ may denote an output frame.

$IA(x,y)$ may denote pixel information corresponding to x and y coordinates in the first interpolation frame obtained based on the first interpolation method.

$IB(x,y)$ may denote pixel information corresponding to x and y coordinates in the second interpolation frame obtained based on the second interpolation method.

$CA(x,y)$ may denote the first confidence corresponding to x and y coordinates in the first interpolation frame.

$CB(x,y)$ may denote the second confidence corresponding to x and y coordinates in the second interpolation frame.

$CA(x,y)/(CA(x,y)+CB(x,y))$ may denote the first weight applied to the first interpolation frame.

$CB(x,y)/(CA(x,y)+CB(x,y))$ may denote the second weight applied to the second interpolation frame.

The electronic apparatus 100 may obtain an output frame corresponding to the x, y coordinates by using the first confidence corresponding to the x, y coordinates of the first interpolation frame and the second confidence corresponding to the x, y coordinates of the second interpolation frame. The electronic apparatus 100 may use the first confidence and the second confidence as a weight.

The electronic apparatus 100 may receive two or more consecutive frames from a buffer memory in which an input image is stored, and may perform frame interpolation with different interpolation methods. Therefore, the first interpolation image and the second interpolation image generated by each interpolation module may have a higher frame rate than the input image. For example, when the disclosure is applied to a TV system having a 120 Hz scanning rate, the respective frame interpolation module may perform a frame interpolation of five times to output an interpolation image interpolated with 120 fps.

The output image generation module may receive two or more interpolation images obtained by each interpolation module to generate one output image. The method for generating the output image may use a weighted sum of several interpolation images, and the weight may be used by dividing the confidence of each interpolation image by the sum of the confidence of all the interpolation images. For example, a system composed of two first interpolation modules and a second interpolation module may synthesize the interpolation image IA and the interpolation image IB for respective pixels based on Equation 710 to generate an output image IO.

The weight of respective interpolation images in the Equation 710 may be applied locally to respective pixels.

According to another embodiment, the weight of each interpolation image may be implemented in a format of global application. If the global weight is used, the electronic apparatus 100 may determine the global weight using an average of the confidence of respective pixels or blocks.

The electronic apparatus 100 may generate an output frame using a confidence average obtained by different interpolation methods. Here, the electronic apparatus 100 may use equation 720.

The equation 720 may be as shown below:

$$IO(x,y) = \{\text{average } CA/(\text{average } CA + \text{average } CB)\}*IA(x,y) + \{\text{average } CB/(\text{average } CA + \text{average } CB)\}*IB(x,y)$$

$$IO(x,y) = \{CA(x,y)/(CA(x,y)+CB(x,y))\}*IA(x,y) + \{CB(x,y)/(CA(x,y)+CB(x,y))\}*IB(x,y)$$

As the descriptions of $IO(x,y)$, $IA(x,y)$, and $IB(x,y)$ are identical with the description of equation 710 and redundant description will not be provided.

The average CA may refer to a first confidence average corresponding to the entire area of the first interpolation frame.

The average CB may refer to the second confidence average corresponding to the entire area of the second interpolation frame.

The electronic apparatus 100 may obtain an output frame corresponding to the x, y coordinates by using a first confidence average corresponding to the entire area of the first interpolation frame and a second confidence average corresponding to the entire area of the second interpolation frame. The electronic apparatus 100 may use the first confidence average and the second confidence average as a weight. Since the electronic apparatus 100 uses a confidence average, the entire area of the output frame may be an area in which the first interpolation frame and the second interpolation frame are combined at the same rate.

According to another embodiment, the electronic apparatus 100 may generate an output frame using the confidence obtained by one of the confidence obtained by different interpolation methods. The electronic apparatus 100 may use Equation 730 or Equation 740.

Equation 730 may be as shown below:

$$IO(x,y)=CA(x,y)*IA(x,y)+\{1-CA(x,y)\}*IB(x,y)$$

The descriptions of IO(x,y), IA(x,y), IB(x,y), CA(x,y) are identical with the description of Equation 710 and a redundant description will be omitted.

The electronic apparatus 100 may combine the first interpolation frame and the second interpolation frame obtained based on different methods to generate an output frame. The electronic apparatus 100 may use only the first confidence corresponding to the first interpolation frame to generate the output frame and may not use the second confidence corresponding to the second interpolation frame, because the first interpolation frame generated by the first interpolation method has a relatively high resolution. For example, it is assumed that the first interpolation method is a high-resolution interpolation method and the second interpolation method is a low-resolution interpolation method. The relatively low-resolution interpolation method (the second interpolation method) may result in poor quality of the output frame in generating the second interpolation frame. Therefore, even if the confidence is higher than the high resolution interpolation method (the first interpolation method), the electronic apparatus 100 may generate an output frame using only the first interpolation frame of the high-resolution interpolation method (the first interpolation method) without considering the second interpolation frame of the low-resolution interpolation method (the second interpolation method) having a high confidence. Accordingly, the electronic apparatus 100 may mainly consider the first interpolation method in spite of generating the output frame by using both the first interpolation frame and the second interpolation frame. The electronic apparatus 100 may generate an output frame using only the first confidence obtained based on one first interpolation method, such as Equation 730. Thus, the electronic apparatus 100 may omit the second confidence acquisition operation and perform only the first confidence acquisition operation.

The Equation 730 may be used in a method for generating an output frame using only the first confidence obtained based on the first interpolation method.

The Equation 740 may be used for a method of generating an output frame using only the second confidence obtained based on the second interpolation method.

The Equation 740 is as shown below:

$$IO(x,y)=\{1-CB(x,y)\}*IA(x,y)+CB(x,y)*IB(x,y)$$

The descriptions of IO(x,y), IA(x,y), IB(x,y), CB(x,y) are identical with the description of the Equation 710 and a redundant description will not be provided.

In the above example, it is assumed that the first interpolation method is a high-resolution interpolation method and the second interpolation method is a low-resolution interpolation method. The operation of obtaining the first confidence and the second confidence according to the first interpolation method and the second interpolation method require time, and the first confidence acquisition time according to the high resolution interpolation method may take a longer time. The electronic apparatus 100 may omit the first confidence acquisition operation and perform only the second confidence acquisition operation.

According to another embodiment, the electronic apparatus 100 may select only one of the first interpolation image and the second interpolation image to generate an output image. The electronic apparatus 100 may compare the first confidence average and the second confidence average to select one interpolation image.

FIG. 7B is a diagram illustrating an operation of performing weight filtering in generating an output image.

Referring to FIG. 7B, the electronic apparatus 100 may combine different interpolation frames by calculating the confidence of each pixel included in the input image and calculating a weight. When the weight of the interpolation frame changes rapidly or spatially, the combination of the interpolation frames may be somewhat negative. To prevent this, the electronic apparatus 100 may use a temporal or spatial smoothness filter. For example, it is assumed that a spatial filter is applied to a hybrid device using two systems (a first interpolation method and a second interpolation method). If WA is the weight of the first interpolation method for each pixel which has been calculated previously, the W' A may be a weighted value of the filtered first interpolation method. The sum of the first interpolation method and the second interpolation method may be 1, and the weight of the second interpolation method may be 1−W'A (x,y).

The electronic apparatus 100 may obtain the first weight using Equation 750.

The Equation 750 is as specified below:

$$WA(x,y)=CA(x,y)/(CA(x,y)+CB(x,y))$$

The WA(x,y) may be a weight of the first interpolation method.

The CA(x,y) may denote a first confidence corresponding to x and y coordinates of the first interpolation frame.

The CB(x,y) may denote a second confidence corresponding to x and y coordinates of the second interpolation frame.

The electronic apparatus 100 may obtain a first weight filtered using Equation 755.

The Equation 755 is as specified below:

$$W'A(x, y) = \sum_{m=-k}^{k} \sum_{n=-k}^{k} F(m, n)WA(x + m, y + n)$$

The W'A(x,y) may denote filtered first weight.

The F(m,n) may be a filter of m,n coordinate (filter function or filter data).

The electronic apparatus 100 may generate an output image based on Equation 760.

The Equation (760) is as specified below:

$$IO(x,y)=W'A(x,y)*IA(x,y)+\{1-W'A(x,y)\}*IB(x,y)$$

The IO(x,y) may denote an output frame.
The W'A(x,y) may be a filtered first weight.
The 1−W'A(x,y) may be a filtered second weight.
Here, IA(x,y) may denote pixel information corresponding to x and y coordinates in the first interpolation frame obtained based on a first interpolation method.

The IB(x,y) may denote pixel information corresponding to x and y coordinates in the second interpolation frame obtained based on the second interpolation method.

The electronic apparatus 100 may control (or change) the drastically changeable confidence (or weight) over time based on Equation (765).

The Equation (765) is as specified below.

$$W'A(x,y,t)=\alpha WA(x,y,t)+(1-\alpha)*WA(x,y,t-1)$$

The W'A(x,y,t) may denote a changed weight at a point in time t.

Here, alpha α may be a variable for controlling the drastic change of the weight and may have a value between 0 and 1.

The WA (x,y,t) may be a weight at a point in time t.

The WA(x,y,t−1) may be a weight at a point in time t−1.

In order to apply the weight filter, the electronic apparatus 100 may store pre-calculated weights in the weight buffer. For example, in the case of a spatial filter, a Gaussian smoothness filter, an average filter, and the like, may be used. In the case of a temporal filter, a finite impulse response (FIR) filter or an infinite impulse response (IIR) filter may be used. Here, the IIR filter may have a method of calculating a final weight as a weighted value of a weight of a previous frame and a weight of a current frame. According to an embodiment, the electronic apparatus 100 may calculate a weight per pixel and obtain a weight filter in the weight buffer. The electronic apparatus 100 may apply a weight filter to the calculated weighted value for respective pixels to obtain a weighted value for each final pixel.

According to another embodiment, the electronic apparatus 100 may calculate a weight of each block and obtain a weight filter in the weight buffer. The electronic apparatus 100 may apply a weight filter to the calculated block weights and perform a weight interpolation operation. The electronic apparatus 100 may obtain a weighted value for each final pixel.

The electronic apparatus 100 may calculate a weight of each block or some pixels in order to increase the speed of the weight calculation, and then may interpolate the weighted value to utilize the weighted value for each pixel. The electronic apparatus 100 may use a weight filter and then interpolate the weight value again to use the weight value as a final pixel weight.

The block-based weight calculation method described above may be used in a block-based motion estimation (ME)/motion-compensated frame interpolation (MCFI) system that is easy to calculate a weight for each block. If the calculation of each block is difficult, the electronic apparatus 100 may calculate only the weight of the center pixel of each block and calculate the weight for each final pixel through filtering and interpolation.

FIG. 8 is a flowchart illustrating an embodiment of performing down-sampling and up-sampling operations in one interpolation method of a plurality of interpolation methods.

Referring to FIG. 8, the electronic apparatus 100 may obtain a first frame and a second frame in operation S805. Since the description of the first and second frames has been described in detail with reference to FIG. 3, a detailed description thereof will be omitted.

The electronic apparatus 100 may obtain interpolation image and confidence corresponding to each interpolation module by using the first interpolation module 810 corresponding to the first interpolation method and the second interpolation module 820 corresponding to the second interpolation method.

The operations S810, S815, S820, and S825 may correspond to S510, S515, S520, and S525 of FIG. 5 and a redundant description will be omitted.

The electronic apparatus 100 may obtain a down-sampled frame based on the down-sampling module of the second interpolation method in operation S830. The electronic apparatus 100 may down-sample the acquired first and second frames. The down-sampled frame(s) may mean a frame in which the first frame and the second frame are each down-sampled.

The electronic apparatus 100 may obtain the second motion vector based on the second interpolation method in operation S835. The electronic apparatus 100 may obtain a second motion vector corresponding to the down-sampled frame (down-sampled first frame and the second frame) based on the motion vector generation module included in a second interpolation module 820.

The electronic apparatus 100 may obtain the second interpolation frame based on the second motion vector in operation S840. The electronic apparatus 100 may obtain a second interpolation frame based on the interpolation frame generation module included in the second interpolation module 820.

The electronic apparatus 100 may obtain an up-sampled frame based on the up-sampling module of the second interpolation method in operation S845. The electronic apparatus 100 may up-sample the obtained second interpolation frame. The up-sampled frame may denote an up-sampled second interpolation frame.

The electronic apparatus 100 may obtain the second interpolation image based on the first frame, the second frame, and the up-sampled second interpolation frame in operation S850. The electronic apparatus 100 may obtain the second interpolation image in the order of the first frame, an up-sampled second interpolation frame, and a second frame.

The electronic apparatus 100 may obtain the second confidence based on at least one of the second motion vector, the second interpolation frame, or the second interpolation image in operation S855. It has been described that operation S855 is performed after operation S850, the operation of obtaining confidence may be performed immediately after operation S835 or immediately after operation S840.

The electronic apparatus 100 may obtain an output image based on the first interpolation image, the first confidence, the second interpolation image, and the second confidence in operation S860.

According to the embodiment of FIG. 8, the interpolation image is generated in operations S820 and S840, but according to an embodiment, an operation of generating an interpolation image may be omitted. In operation S860, the electronic apparatus 100 may generate a combined interpolation frame based on the first interpolation frame and the second interpolation frame, and generate an output image based on the first frame, the second frame, and the combined interpolation frame. The detailed description related thereto will be described later with reference to FIG. 16.

Figure 9:
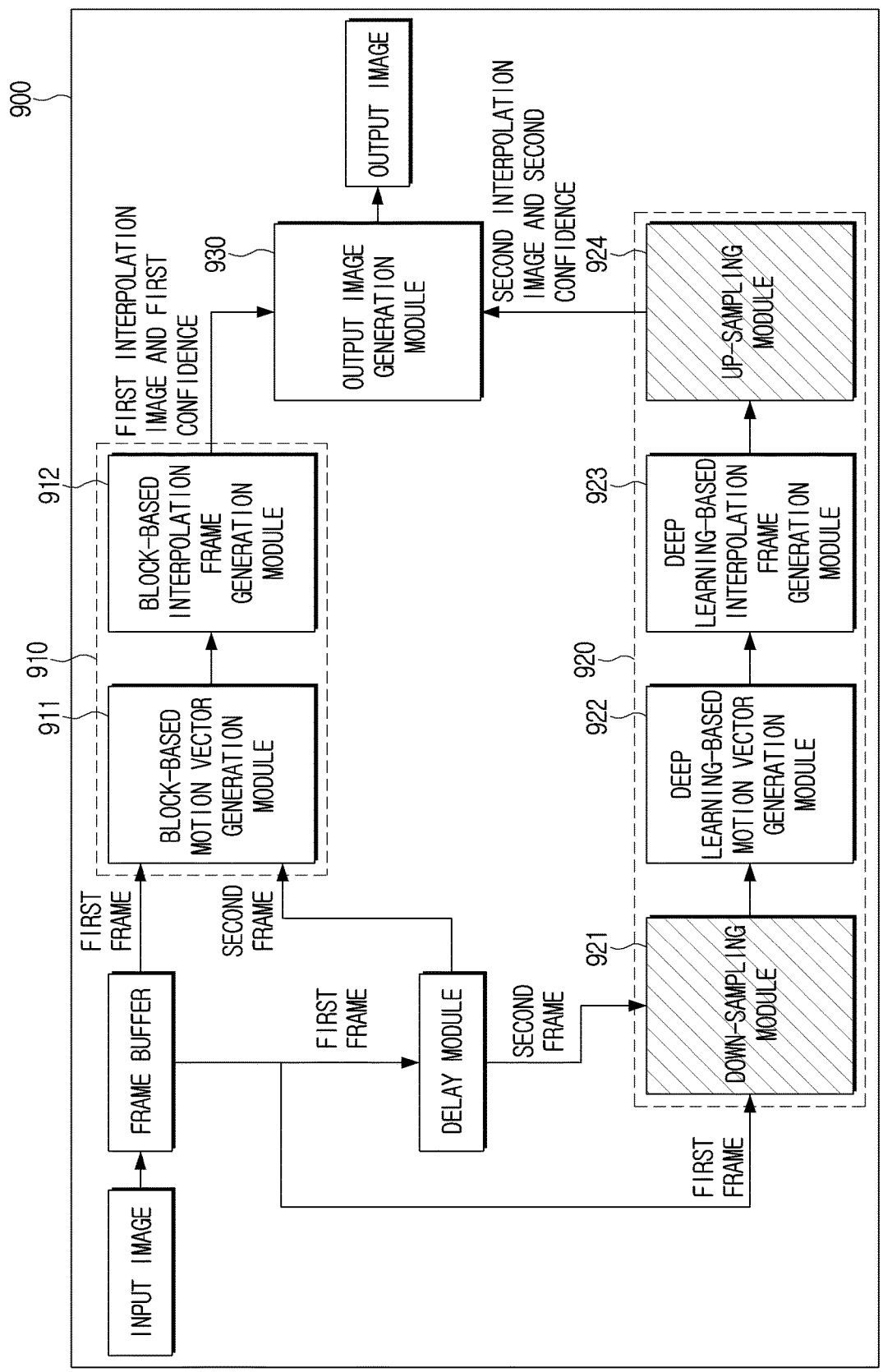
FIG. 9 is a diagram illustrating a specific operation of FIG. 8.

FIG. 9 is a diagram illustrating a specific operation of FIG. 8.

Referring to FIG. 9, according to an embodiment 900, the electronic apparatus 100 may receive an input image, and may obtain a first frame and a second frame, which is a previous frame of the first frame, using the frame buffer and the delay module. Since the operation related thereto has been described in FIG. 3, a redundant description will be omitted.

The electronic apparatus 100 may obtain a first interpolation image based on a first interpolation method and obtain a second interpolation image based on a second interpolation method.

The first interpolation method may be a block-based interpolation method, and the second interpolation method may be a deep learning-based interpolation method. A first interpolation module 810 may be a block-based interpolation module 910, and a second interpolation module 820 may be a deep learning-based interpolation module 920.

The block-based interpolation module 910 may include a block-based motion vector generation module 911 and a block-based interpolation frame generation module 912. The deep learning-based interpolation module 920 may include a down-sampling module 921, a deep learning-based motion vector generation module 922, a deep learning-based interpolation frame generation module 923, and an up-sampling module 924.

Since the description of the block-based interpolation module 910 is duplicated with the operation of the block-based interpolation module 610 of FIG. 6, the description of the block-based interpolation module 910 is omitted.

The down-sampling module 921 may down-sample the received first frame and the second frame to obtain a down-sampled frame. The down-sampled frame may denote a down-sampled first frame and a down-sampled second frame.

A deep learning-based motion vector generation module 922 may obtain a second motion vector based on the down-sampled first frame and the down-sampled second frame. The deep learning-based motion vector generation module 922 may transmit the obtained second motion vector to the deep learning-based interpolation frame generation module 923.

The deep learning-based interpolation frame generation module 923 may generate a second interpolation frame based on the received second motion vector. The deep learning-based interpolation frame generation module 923 may transmit the generated second interpolation frame to an up-sampling module 924.

The up-sampling module 924 may up-sample the received second interpolation frame. The up-sampled frame may mean an up-sampled second interpolation frame.

The deep learning-based interpolation module 920 may add a second interpolation frame between the first frame and the second frame to generate a second interpolated image. The second interpolation image may be an image reproduced in an order of the second frame, the second interpolation frame, and the first frame. The second interpolation frame may be at least one frame and may be two or more frames.

The deep learning-based interpolation module 920 may transmit the second interpolation image and the second confidence to the output image generation module 930.

The output image generation module 930 may generate an output image based on the first interpolation image received from the block-based interpolation module 910 and the second interpolation image and the second confidence received from the deep learning-based interpolation module 920.

The embodiment 900 of FIG. 9 illustrates a high-resolution frame interpolation system that performs frame interpolation at different resolutions by the block-based interpolation module 910 and the deep learning-based interpolation module 920. Since the deep learning-based frame interpolation system has a high computation amount and complexity, a very high cost may be required to perform real-time operation at a high resolution, such as 4K or 8K. Accordingly, the deep learning-based frame interpolation system may not be suitable for consumer electronics, such as a TV. However, in order to solve this problem, the block-based interpolation module 910 may operate at high resolution and the deep learning-based interpolation module 920 may operate at a low resolution and then the electronic apparatus 100 may up-sample the result to generate an output image. In such a system, the weight of each interpolation image applied to the output image generator may further use a speed or texture other than the confidence or prediction error of the corresponding image.

In the case of a frame interpolation system for processing an input image having a high resolution such as 4K or 8K in real time, the amount of computation and processing speed that may be implemented differently from the non-real-time system is constrained. In particular, since the calculation amount is very large in the case of the deep learning-based frame interpolation system, a large amount of computation may be required for real-time processing of the high-resolution image. To overcome this constraint, the electronic apparatus 100 may operate the deep learning-based interpolation module 920 at a low resolution, operate the block-based interpolation module 910 at a high resolution, and then synthesize the result. The electronic apparatus 100 may implement a high-resolution real-time hybrid frame interpolation system having a high resolution basic performance and a deep learning-based system such as deformation processing of an object.

In this system, the weight calculation method of the interpolation image of each system may be a criterion for the block-based interpolation module 910. Thus, a pixel having a high confidence of the first interpolation image of the block-based interpolation module 910 operating at high resolution may mainly use a first interpolation image having a high resolution and a pixel that is not higher than the first interpolation image of the block-based interpolation module 910 may use a second interpolation image having a low resolution. For example, the electronic apparatus 100 may utilize the equation 730 of FIG. 7.

The system may have an advantage in cognitive visual aspect. The system as above may have an advantage in cognitive visual aspects. An area where a block-based ME/MCFI technique corresponding to the block-based interpolation module 910 is not operated is mainly an area in which the speed of an object is fast, an area in which the object is deformed, an edge in the object or background, or a textureless area. However, such areas may not have high frequency components in the image due to motion blur or lack of motion blur or lack of texture due to deformation of the object. Since the motion blur occurs in the electronic apparatus 100 outputting the image, the high frequency component recognized by the time may be very small. Even though an image interpolated at a low resolution is up-sampled to a corresponding area and output, the visual quality degradation is not that significant, and rather, if the structural characteristics and deformation of the object are represented well, a visual quality of a final result image may be improved.

In calculating the confidence of the first interpolation image of the block-based interpolation module 910, a speed or an edge, an intensity of a texture, and the like may be additionally used in addition to the matching error, a smoothness of the motion vector field or an optical flow field, or an error between warping images.

The result of the deep learning-based interpolation module 920 may be naturally mixed by lowering the confidence of the area where the speed is fast and there is no edge or texture. For example, the electronic apparatus 100 may use $1/(1+\gamma*|v|)$, $1/(1+\delta*\text{textureness})$, or the like, as an additional confidence item. Here, $|v|$ may be a size of a motion vector, and textureness may be a local variance of the result image or local mean of a gradient vector size. Here, $\gamma$ and $\delta$ may be a constant.

According to an embodiment of FIG. 9, the interpolation image is generated in the block-based interpolation module 910 and the deep learning-based interpolation module 920, but according to an implementation example, a step in which an interpolation image is generated may be omitted. The output image generation module 930 may generate a combined interpolation frame based on the first interpolation frame and the second interpolation frame, and generate an output image based on the first frame, the second frame, and the combined interpolation frame. The detailed description related thereto will be described later with reference to FIG. 17.

Figure 10:
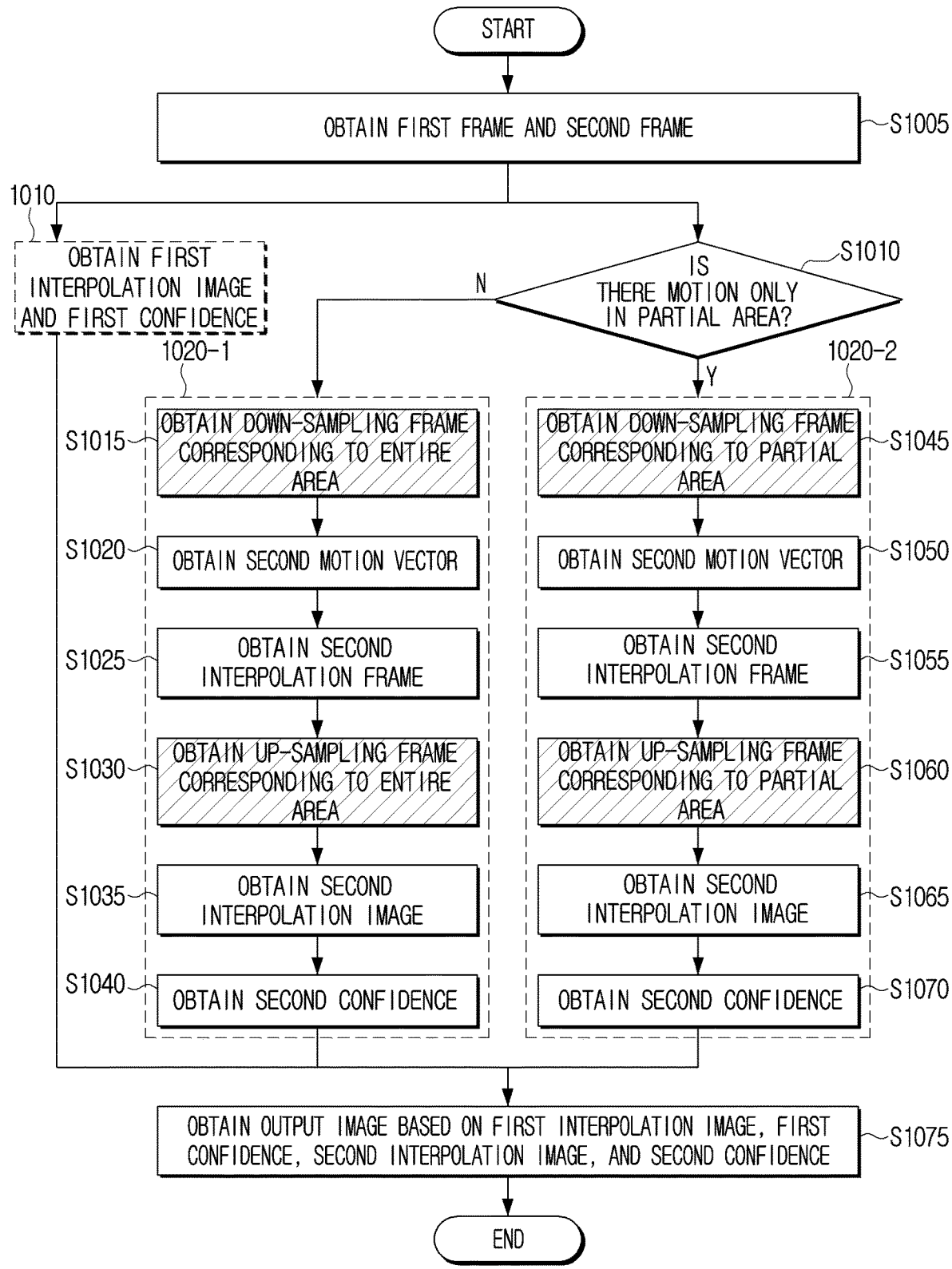
FIG. 10 is a flowchart illustrating an embodiment of determining a down-sampling area according to a motion of an input image.

FIG. 10 is a flowchart illustrating an embodiment of determining a down-sampling area according to a motion of an input image.

Referring to FIG. 10, the electronic apparatus 100 may obtain a first frame and a second frame in operation S1005. Since the description of the first and second frames has been described in detail with reference to FIG. 3, a detailed description thereof will be omitted.

The electronic apparatus 100 may obtain interpolation image and confidence corresponding to each interpolation module using a first interpolation module 1010 corresponding to the first interpolation method, a second interpolation module 1020-1 corresponding to the second interpolation method, and a third interpolation module 1020-2 corresponding to the third interpolation method. According to an implementation example, the second interpolation module 1020-1 and the third interpolation module 1020-2 may be implemented in one module.

The operation of the first interpolation module 1010 may correspond to the first interpolation module 810 of FIG. 8 and a redundant description will be omitted.

In operation S1010, the electronic apparatus 100 may identify whether the movement of the first frame and the second frame exists only in partial areas based on the first frame and the second frame obtained in operation S1005. The electronic apparatus 100 may analyze each frame of the received input image in real time to identify whether a motion exists in a partial area or an entire area. The reference and degree of motion of an area for distinguishing a partial area or an entire area may be changed according to user settings.

The electronic apparatus 100 may compare a specific coordinate, a specific area, or a motion vector corresponding to a specific block with the total average value of the motion vector to identify whether there is a motion only in a partial area. Specifically, the electronic apparatus 100 may identify that there is motion only in a partial area if the value obtained by dividing a motion vector corresponding to a specific coordinate, a specific area, or a specific block by the total average value of the motion vector is greater than or equal to a threshold value. If the value obtained by dividing the motion vector corresponding to a specific coordinate, a specific area, or a specific block by the total average value of the motion vector is less than a threshold value, the electronic apparatus 100 may identify that motion exists in the entire area.

According to an embodiment, the electronic apparatus 100 may identify whether motion exists only in a partial area of the input image based on the first motion vector obtained by the first interpolation module 1010. The electronic apparatus 100 may identify whether a motion exists in the entire area or a partial area based on the first motion vector.

According to another embodiment, the electronic apparatus 100 may identify whether motion exists only in a partial area of the input image based on the second motion vector S1020 and S1050 obtained by the second interpolation module 1010. The operation S1010 may be an operation performed prior to steps S1020 and S1050. Accordingly, in initial operation S1010, a down sampling operation corresponding to the entire area may be performed. When the interpolation frame for the next frame which is reproduced after the first frame is generate, it is possible to determine whether the motion is identified in a partial area or an entire area based on the second motion vector obtained in operation S1020. Since the motion of the image is continuous, there may be many cases that affect the next frame. The electronic apparatus 100 may obtain a second motion vector based on the first frame and the second frame, and determine whether the motion is identified in a partial area or entire area based on the second motion vector in the step of generating an interpolation frame for the third frame (the next frame of the first frame, the current frame), and the first frame (previous frame).

If it is identified that the motion is not present in only a partial area in the first frame and the second frame, the electronic apparatus 100 may obtain a down-sampled frame for the entire area based on the down-sampling module of the second interpolation method in operation S1015. The electronic apparatus 100 may down-sample the entire area of the first frame and the entire area of the second frame. Thus, the down-sampled frame (s) may mean a frame in which the entire area of the first frame and the entire area of the second frame are each down-sampled.

The obtaining the down-sampled frame for the entire area of the first frame and the entire area of the second frame in operation S1015, obtaining a second interpolation frame in operation S1020, obtaining a second interpolation frame in operation S1025, obtaining an up-sampled frame for an entire area of the second interpolation frame in operation S1030, obtaining a second interpolation image in operation S1035, and obtaining a second confidence in operation S1040 may correspond to operations S830, S835, S840, S845, S850, and S855 of FIG. 8, and thus a duplicate description will be omitted.

When the motion of the first frame and the second frame is identified as existing only in a partial area, the electronic apparatus 100 may obtain a down-sampled frame for a partial area based on the down-sampling module of the second interpolation method in operation S1045.

Unlike the second interpolation module 1020-1, the third interpolation module 1020-2 may generate an interpolation frame for only a partial area other than the entire area of the frame. When the motion is concentrated only in some areas, the operation of generating the interpolation frame with respect to the entire area may be inefficient. The electronic apparatus 100 may identify a partial area in which a motion is primarily identified as a target area and may generate a second interpolated frame based on the target area of the first frame and the target area of the second frame.

The obtaining the down-sampled frame for the partial area (or target area) of the first frame and the partial area (or target area) of the second frame in operation S1045, obtaining a second motion vector in operation S1050, obtaining a second interpolation frame in operation S1055, obtaining an up-sampled frame for a partial area (or target area) of the second interpolation frame in operation S1060, obtaining a second interpolation image in operation S1065, and obtaining a second confidence in operation S1070 may correspond to operations S830, S835, S840, S845, S850, and S855 of FIG. 8, except that an operation is performed for a partial area and thus a duplicate description will be omitted.

The electronic apparatus 100 may obtain the output image based on the first interpolation image, the first confidence, the second interpolation image, and the second confidence in operation S1075.

Referring to the embodiment of FIG. 10, the interpolation image is generated in steps S1035 and S1065, but according to an implementation example, a step in which an interpolation image is generated may be omitted. In operation S1075, the electronic apparatus 100 may generate a combined interpolation frame based on the first interpolation frame and the second interpolation frame, and generate an output image based on the first frame, the second frame, and the combined interpolation frame. The detailed description related thereto will be described later with reference to FIG. 16.

Figure 11:
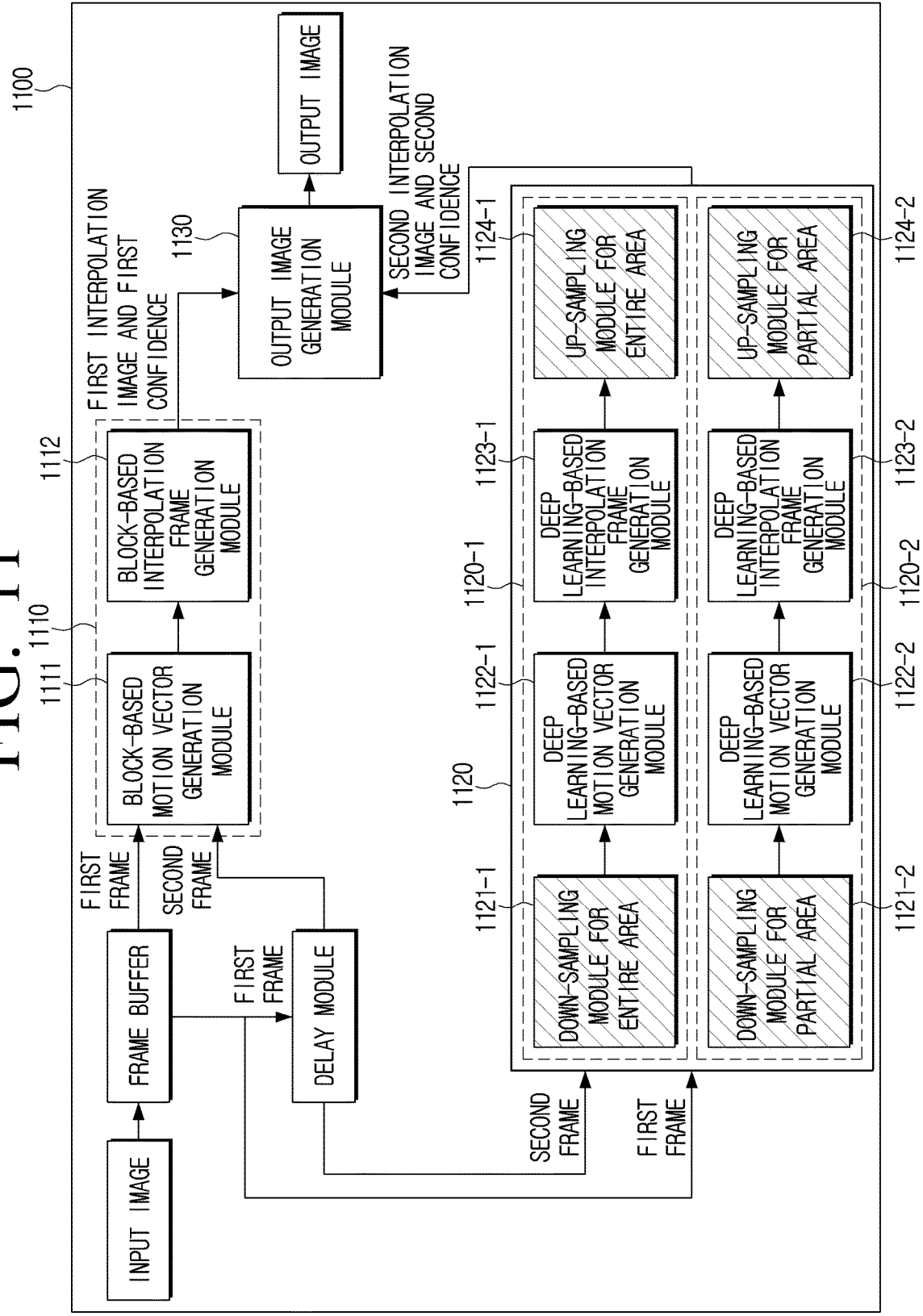
FIG. 11 is a diagram illustrating a specific operation of FIG. 10.

FIG. 11 is a diagram illustrating a specific operation of FIG. 10.

Referring to FIG. 11, according to an embodiment 1100, the electronic apparatus 100 may receive an input image, and may obtain a first frame and a second frame, which is a previous frame of the first frame, using the frame buffer and the delay module. Since the operation related to this has been described in FIG. 3, a duplicate description will be omitted.

The electronic apparatus 100 may obtain the first interpolation image based on the first interpolation method, and may obtain the second interpolation image based on the second interpolation method.

The first interpolation method may be a block-based interpolation method, and the second interpolation method may be a deep learning-based interpolation method. The first interpolation module 1010 may be a block-based interpolation module 1110, and the second interpolation module 1020-1 and the third interpolation module 1020-2 may be deep learning-based interpolation modules 1120-1 and 1120-2.

The block-based interpolation module 1110 may include a block-based motion vector generation module 1111 and a block-based interpolation frame generation module 1112.

The deep learning-based interpolation module 1120-1 may include a down-sampling module 1121-1 for the entire area, a deep learning-based motion vector generation module 1122-1, a deep learning-based interpolation frame generation module 1123-1, and an up-sampling module 1124-1 for the entire area.

The deep learning-based interpolation module 1120 -2 may include a down sampling module 1120-2 for a partial area, a deep learning-based motion vector generation module 1122-2, a deep learning-based interpolation frame generation module 1123-2, and an up-sampling module 1124 -2 for a partial area.

The description about the block-based interpolation module 1110 is duplicate with the operation of the block-based interpolation module 610 of FIG. 6 and will not be described.

There may be one control module 1120, including deep learning-based interpolation module 1120-1 and deep learning-based interpolation module 1120-2, may exist according to an implementation example. The control module 1120 may identify whether the motion in the input image is generally present in the entire area or only in a partial area.

Specifically, the electronic apparatus 100 may identify a target area where motion occurs by comparing the first frame and the second frame, and identify whether a motion occurs in the entire area or in a partial area in consideration of a range of the target area.

If it is identified that a motion occurs in the entire area, the control module 1120 may obtain a down-sampled frame corresponding to the entire area of the first frame and the entire area of the second frame based on the down-sampling module 1121-1 for the entire area. The deep learning-based motion vector generation module 1122-1 may obtain a second motion vector based on the entire area of the down-sampled frame. The deep learning-based interpolation frame generation module 1123-1 may generate a second interpolation frame based on the obtained motion vector. The up-sampling module 1124-1 for the entire area may up-sample the generated second interpolation frame. The deep learning-based interpolation module 1120-1 may generate the second interpolation image which is reproduced in an order of the second frame, the up-sampled second interpolation frame, and the first frame.

The operations of the down-sampling module 1121-1 for the entire area, a deep learning-based motion vector generation module 1122-1, the deep learning-based interpolation frame generation module 1123-1, the up-sampling module 1124-1 for the entire area, and the deep learning-based interpolation module 1120-1 may correspond to operations of the down-sampling module 921, the deep learning-based motion vector generation module 922, the deep learning-based interpolation frame generation module 923, the up-sampling module 924, and the deep learning-based interpolation module 920 of FIG. 9 and thus, redundant description will be omitted.

When it is identified that the motion occurs in a partial area, the control module 1120 may obtain a down-sampled frame corresponding to a partial area of the first frame and a partial area of the second frame based on the down-sampling module 1121-2 for a partial area. The deep learning-based motion vector generation module 1122-2 may obtain a second motion vector based on a partial area of the down-sampled frame. The deep learning-based interpolation frame generation module 1123-2 may generate a second interpolation frame based on the obtained motion vector. The up-sampling module 1124 -2 for a partial area may up-sample the generated second interpolation frame. The deep learning-based interpolation module 1120-2 may generate the second interpolation image reproduced in an order of the second frame, the up-sampled second interpolation frame, and the first frame.

The operations of the down-sampling module 1121-2 for the partial area, a deep learning-based motion vector generation module 1122-2, the deep learning-based interpolation frame generation module 1123-2, the up-sampling module 1124-2 for the partial area, and the deep learning-based interpolation module 1120-2 may correspond to operations of the down-sampling module 921, the deep learning-based motion vector generation module 922, the deep learning-based interpolation frame generation module 923, the up-sampling module 924, and the deep learning-based interpolation module 920 of FIG. 9 and thus, redundant description will be omitted.

The control module 1120 may transmit the second interpolation image and the second confidence to an output image generation module 1130.

The output image generation module 1130 may generate an output image based on the first interpolation image and the first confidence received from the block-based interpolation module 1110 and the second interpolation image and the second confidence received from the control module 1120.

According to the embodiment of FIG. 11, it has been described that the interpolation image is generated in the block-based interpolation module 1110 and the deep learning-based interpolation module 1120-1 and 1120-2, but in accordance with an implementation example, the step of generating the interpolation image may be omitted. The output image generation module 1130 may generate a combined interpolation frame based on the first interpolation frame and the second interpolation frame, and generate an output image based on the first frame, the second frame, and the combined interpolation frame. The detailed description related thereto will be described later with reference to FIG. 17.

Figure 12:
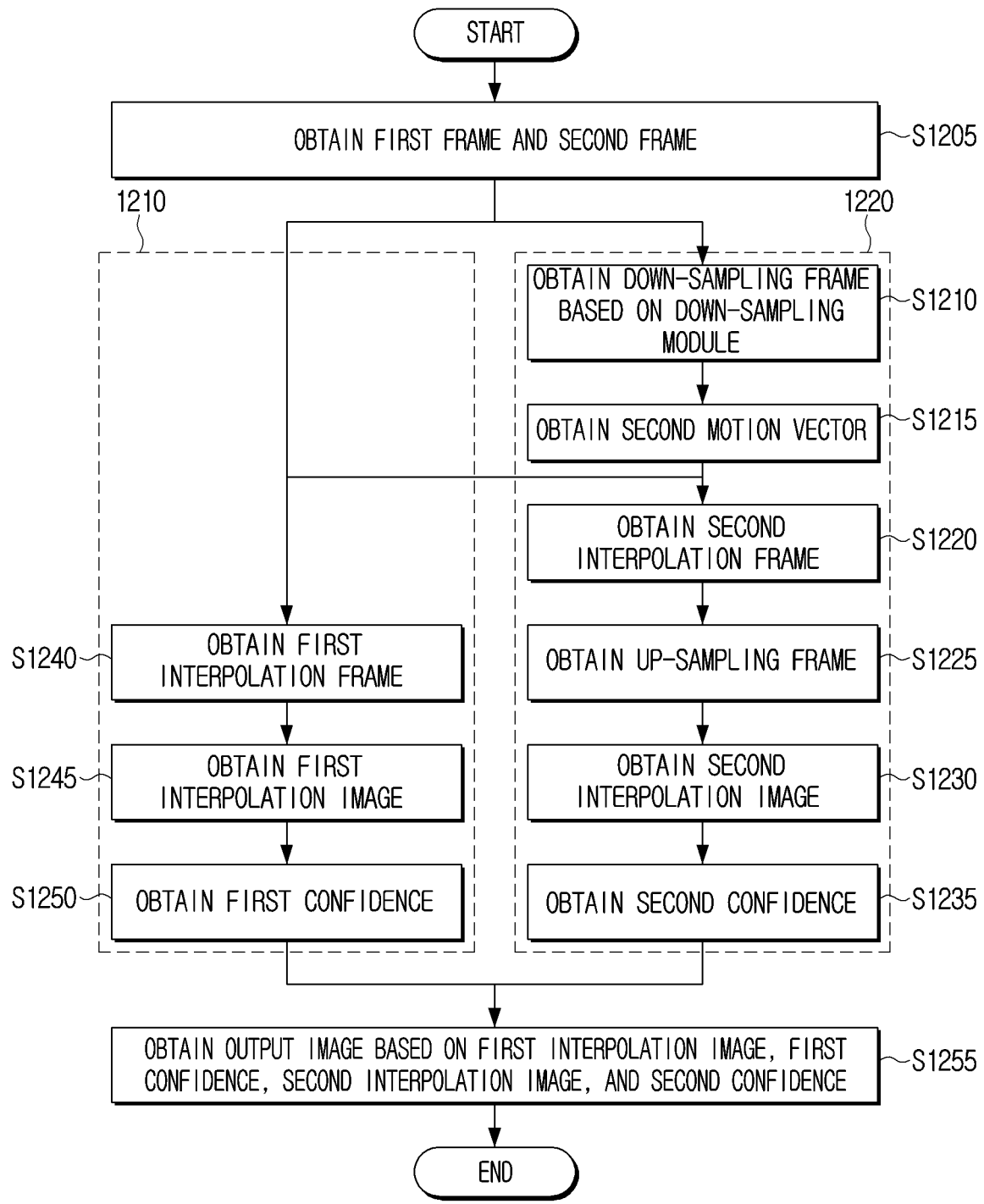
FIG. 12 is a flowchart illustrating an embodiment of obtaining a motion vector in only one method among a plurality of interpolation methods.

FIG. 12 is a flowchart illustrating an embodiment of obtaining a motion vector in only one method among a plurality of interpolation methods.

Referring to FIG. 12, the electronic apparatus 100 may obtain a first frame and a second frame in operation S1205. Since the description of the first and second frames has been described in detail with reference to FIG. 8, a detailed description thereof will be omitted.

The electronic apparatus 100 may obtain interpolation image and confidence corresponding to each interpolation module by using a first interpolation module 1210 corresponding to a first interpolation method and a second interpolation module 1220 corresponding to a second interpolation method.

The operations S1210, S1215, S1220, S1225, S1230, and S1235 may correspond to S830, S835, S840, S845, S850, and S855 of FIG. 8 and will not be further described.

The electronic apparatus 100 may obtain the first interpolation frame based on the second motion vector obtained by the second interpolation module 1220 in operation S1240. In the embodiment of FIG. 8, the electronic apparatus 100 has obtained a first interpolation frame based on a first motion vector obtained based on a first interpolation method. However, in the embodiment of FIG. 12, the electronic apparatus 100 may obtain the first interpolation frame based on the second motion vector obtained based on the second interpolation method.

The electronic apparatus 100 may obtain the first interpolation image based on the first frame, the second frame, and the first interpolation frame in operation S1245. Specifically, the electronic apparatus 100 may obtain a second interpolation image in the order of the first frame, a first interpolation frame, and the second frame.

The electronic apparatus 100 may obtain the first confidence based on at least one of the first interpolation frame or the first interpolation image in operation S1250. Although step S1250 is described as being performed after operation S1245, the operation of obtaining confidence may be performed immediately after operation S1240.

The electronic apparatus 100 may obtain the output image based on the first interpolation image, the first confidence, the second interpolation image, and the second confidence in operation S1255.

In the embodiment of FIG. 12, the interpolation image is generated in steps S1245 and S1230, but according to an implementation example, a step in which an interpolation image is generated may be omitted. In operation S1255, the electronic apparatus 100 may generate a combined interpolation frame based on the first interpolation frame and the second interpolation frame, and generate an output image based on the first frame, the second frame, and the combined interpolation frame. The detailed description related thereto will be described later with reference to FIG. 16.

Figure 13:
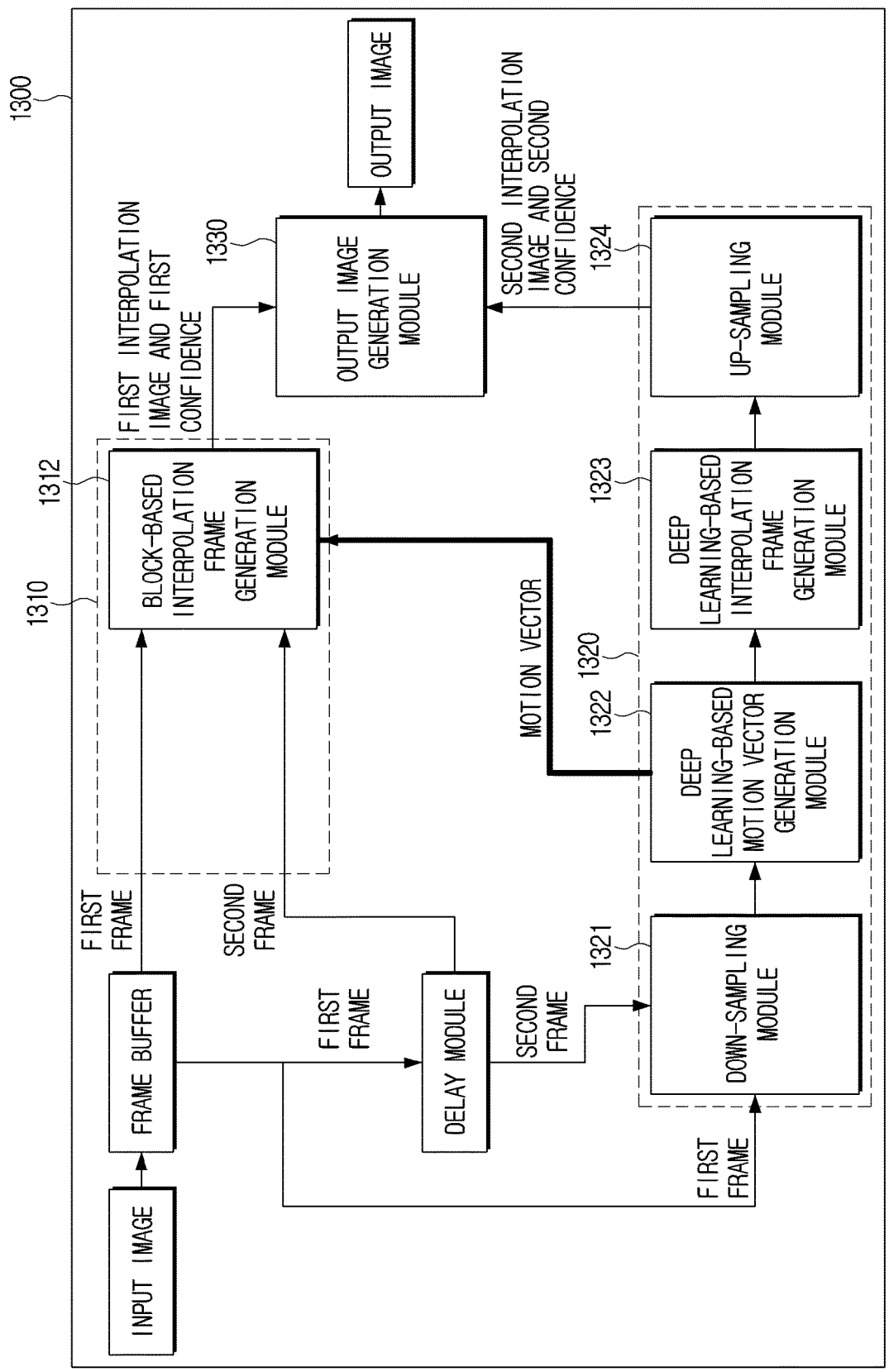
FIG. 13 is a diagram illustrating a specific operation of FIG. 12.

FIG. 13 is a diagram illustrating a specific operation of FIG. 12.

Referring to FIG. 13, according to an embodiment 1300, the electronic apparatus 100 may receive an input image, and may obtain a first frame and a second frame, which is a previous frame of the first frame, using the frame buffer and the delay module. Since the operation related to this is described in FIG. 3, a duplicate description will be omitted.

The electronic apparatus 100 may obtain the first interpolation image based on a first interpolation method and obtain a second interpolation image based on a second interpolation method.

The first interpolation method may be a block-based interpolation method, and the second interpolation method may be a deep learning-based interpolation method. The first interpolation module 1210 may be a block-based interpolation module 1310, and the second interpolation module 1220 may be a deep learning-based interpolation module 1320.

The block-based interpolation module 1310 may include a block-based interpolation frame generation module 1312. The deep learning-based interpolation module 1320 may include a down-sampling module 1321, a deep learning-based motion vector generation module 1322, and a deep learning-based interpolation frame generation module 1323, and an up-sampling module 1324.

The description of a deep learning-based interpolation module 1320 is overlapped with the operation of the deep learning-based interpolation module 920 of FIG. 9, and thus the description thereof will be omitted. Additionally, the deep learning-based motion vector generation module 1322 may transmit the obtained second motion vector to the block-based interpolation frame generation module 1312 of the block-based interpolation module 1310.

The block-based interpolation frame generation module 1312 may generate the first interpolation frame using the second motion vector received from the deep learning-based motion vector generation module 1322.

In addition, the block-based interpolation module 1310 may add a first interpolation frame between the first frame and the second frame to generate a first interpolation image. The first interpolation image may be an image reproduced in the order of a second frame, a first interpolation frame, and a first frame. The first interpolation frame may be at least one frame and may be two or more frames.

The block-based interpolation module 1310 may transmit the first interpolation image and the first confidence to the output image generation module 1330.

The output image generation module 1330 may generate an output image based on the first interpolation image received from the block-based interpolation module 1310 and the second interpolation image and the second confidence received from the deep learning-based interpolation module 1320.

The embodiment 1300 of FIG. 13 is an example of a system for sharing a motion vector obtained by the block-based interpolation module 1310 and the deep learning-based interpolation module 1320 as a different form of the hybrid frame interpolation system. The deep learning-based interpolation module 1320 may be implemented in the form of operating at a high resolution, and may be implemented in a form of up-sampling after operating at a low resolution.

In a hybrid frame interpolation system composed of two systems, such as a block-based interpolation module 1310 and a deep learning-based interpolation module 1320, the electronic apparatus 100 may share an optical flow prediction result of the deep learning-based interpolation module 1320 to the block-based interpolation module 1310. Here, the electronic apparatus 100 may use a block average, a block median value, and the like of the optical flow in order to convert a pixel-based optical flow prediction result into a block-based motion vector field. If the block-based interpolation module 1310 and the deep learning-based interpolation module 1320 operate at different resolutions, an appropriate up-sampling operation for the optical flow prediction result may be performed in accordance with the block-based interpolation module 1310.

In the embodiment of FIG. 13, the interpolation image is generated in the block-based interpolation module 1310 and the deep learning-based interpolation module 1320, but according to an implementation example, an operation in which an interpolation image is generated may be omitted. The output image generation module 1330 may generate a combined interpolation frame based on the first interpolation frame and the second interpolation frame, and generate an output image based on the first frame, the second frame, and the combined interpolation frame. The detailed description related thereto will be described later with reference to FIG. 17.

Figure 14:
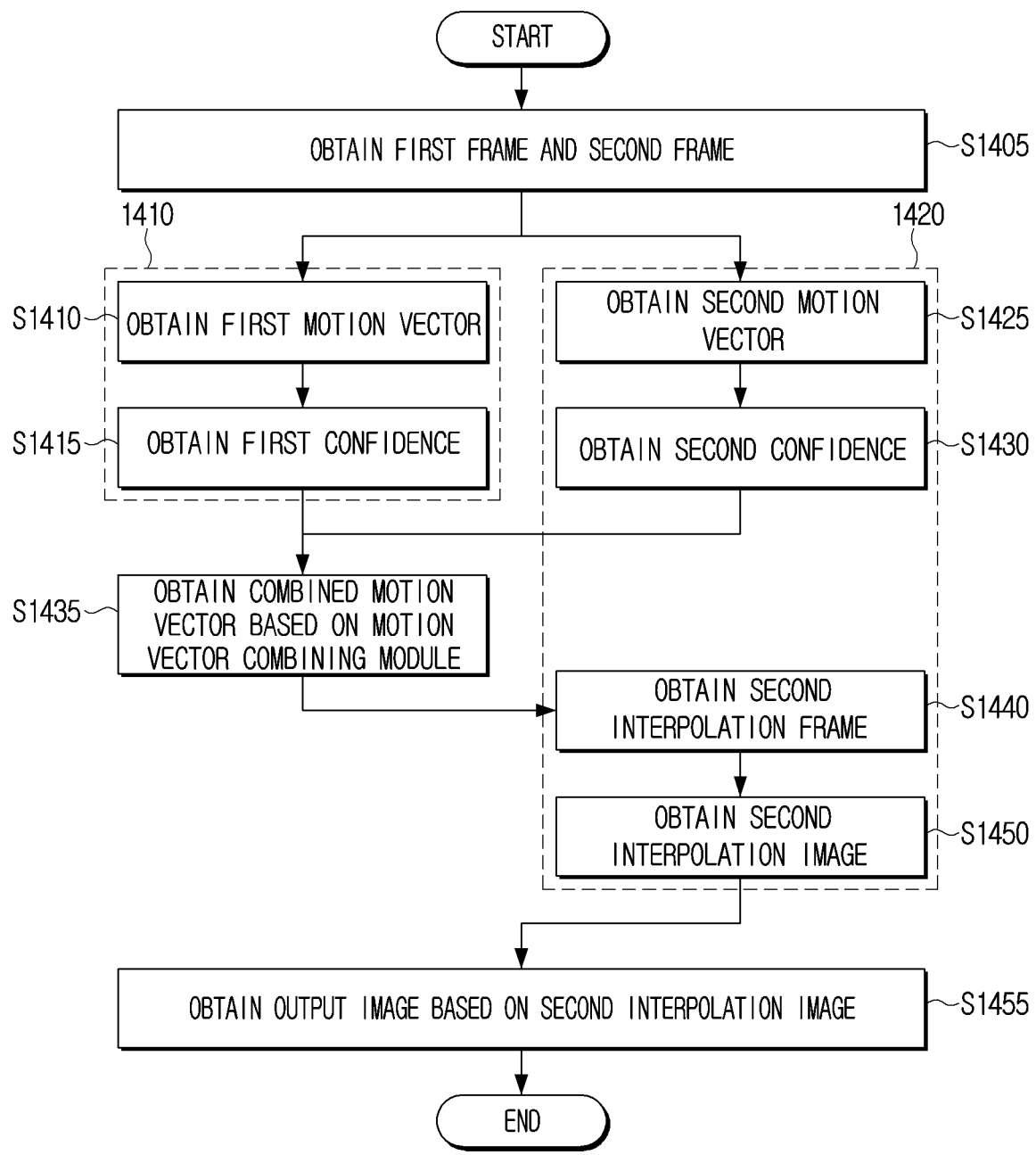
FIG. 14 is a flowchart illustrating an embodiment of obtaining an interpolation frame in only one method among a plurality of interpolation methods.

FIG. 14 is a flowchart illustrating an embodiment of obtaining an interpolation frame in only one method among a plurality of interpolation methods.

Referring to FIG. 14, the electronic apparatus 100 may obtain a first frame and a second frame in operation S1405. Since the description of the first and second frames has been described in detail with reference to FIG. 3, a detailed description thereof will be omitted.

The electronic apparatus 100 may obtain confidence corresponding to each interpolation module using the first interpolation module 1410 corresponding to the first interpolation method and the second interpolation module 1420 corresponding to the second interpolation method.

In detail, the electronic apparatus 100 may obtain the first motion vector based on the first interpolation method in operation S1410. The electronic apparatus 100 may obtain a first motion vector corresponding to the input frames based on the motion vector generation module included in the first interpolation module 1410.

The electronic apparatus 100 may obtain the first confidence based on the obtained first motion vector in operation S1415.

The electronic apparatus 100 may obtain the second motion vector based on the second interpolation method in operation S1425. Specifically, the electronic apparatus 100 may obtain the second motion vector corresponding to the first frame and the second frame based on the motion vector generation module included in the second interpolation module 1420.

The electronic apparatus 100 may obtain the second confidence based on the obtained second motion vector in operation S1430.

Here, the electronic apparatus 100 may obtain a combined motion vector reflecting the first motion vector and the second motion vector based on the motion vector coupling module in operation S1435. The electronic apparatus 100 may combine a first motion vector obtained based on a first interpolation method and a second motion vector obtained based on a second interpolation method. Specifically, the electronic apparatus 100 may generate a combined motion vector (or an output motion vector) based on the first motion vector, the first confidence, the second motion vector, and the second confidence. The motion vector coupling module may transmit the obtained combined motion vector to the second interpolation module 1420.

The second interpolation module 1420 may obtain the second interpolation frame based on the combined motion vector received from the motion vector combining module in operation S1440. The electronic apparatus 100 may obtain a second interpolation frame based on the interpolation frame generation module included in the second interpolation module 1420.

The electronic apparatus 100 may obtain a second interpolation image based on the first frame, the second frame, and the second interpolation frame in operation S1450. The electronic apparatus 100 may obtain the second interpolation image in the order of a first frame, a second interpolation frame, and a second frame.

The electronic apparatus 100 may obtain an output image based on the second interpolation image in operation S1455. In the embodiment of FIG. 8, the first interpolation image and the second interpolation image are combined to obtain an output image, but in the embodiment of FIG. 14, the motion vector of the first interpolation method and the motion vector of the second interpolation method are combined in step S1435. Accordingly, in the embodiment of FIG. 12, the first interpolation image may not be generated as shown in FIG. 8.

In the embodiment of FIG. 14, the interpolation image is generated in step S1450, but according to an implementation example, an operation of generating an interpolation image may be omitted. In operation S1450, the electronic apparatus 100 may generate an output image based on the first frame, the second interpolation frame, and the second frame. The detailed description related thereto will be described later with reference to FIG. 16.

Figure 15:
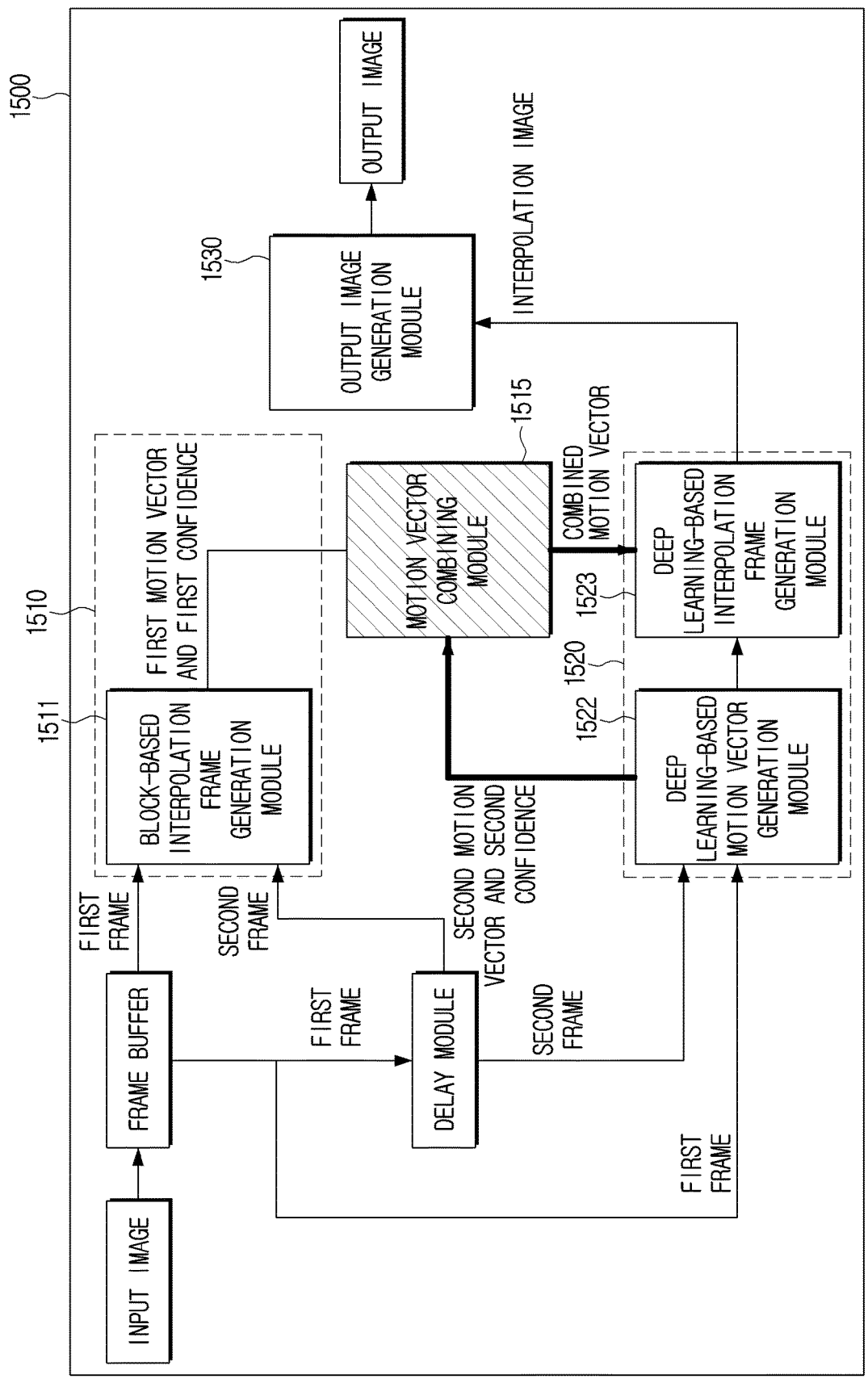
FIG. 15 is a diagram illustrating a specific operation of FIG. 14.

FIG. 15 is a diagram illustrating a specific operation of FIG. 14.

Referring to FIG. 15, according to an embodiment 1500, the electronic apparatus 100 may receive an input image, and may obtain a first frame and a second frame, which is a previous frame of the first frame, using the frame buffer and the delay module. Since the operation related to this is described in FIG. 3, a duplicate description will be omitted.

The electronic apparatus 100 may obtain a first interpolation image based on a first interpolation method and obtain a second interpolation image based on a second interpolation method.

The first interpolation method may be a block-based interpolation method, and the second interpolation method may be a deep learning-based interpolation method. The first interpolation module 1410 may be a block-based interpolation module 1510, and the second interpolation module 1420 may be a deep learning-based interpolation module 1520.

The block-based interpolation module 1510 may include a block-based motion vector generation module 1511. The deep learning-based interpolation module 1520 may include a deep learning-based motion vector generation module 1522 and a deep learning-based interpolation frame generation module 1523.

The block-based motion vector generation module 1511 may obtain the first frame and the second frame. The block-based motion vector generation module 1511 may obtain a first motion vector based on the first frame and the second frame. The block-based motion vector generation module 1511 may transmit the obtained first motion vector to the motion vector combining module 1515.

The block-based interpolation module 1510 may additionally obtain a first confidence corresponding to the first motion vector. The block-based interpolation module 1510 may transmit a first confidence corresponding to the obtained first motion vector to the motion vector combining module 1515.

The deep learning-based motion vector generation module 1522 may obtain a second motion vector based on the first frame and the second frame. The deep learning-based motion vector generation module 1522 may transmit the obtained second motion vector to the motion vector combining module 1515.

The deep learning-based interpolation module 1520 may additionally obtain a second confidence corresponding to the second motion vector. The deep learning-based interpolation module 1520 may transmit a second confidence corresponding to the obtained second motion vector to the motion vector coupling module 1515.

The motion vector combining module 1515 may obtain the combined motion vector based on the first motion vector received from the block-based motion vector generation module 1511 and the second motion vector received from the deep learning-based motion vector generation module 1522. The motion vector combining module 1515 may combine a first motion vector obtained based on the first interpolation method and a second motion vector obtained based on the second interpolation method. The motion vector combining module 1515 may generate a combined motion vector (or an output motion vector) based on the first motion vector, the first confidence, the second motion vector, and the second confidence. The motion vector coupling module may transmit the obtained combined motion vector to the deep learning-based interpolation frame generation module 1523.

The deep learning-based interpolation frame generation module 1523 may generate a second interpolation frame based on the received combined motion vector.

The deep learning-based interpolation module 1520 may add a second interpolation frame between the first frame and the second frame to generate a second interpolated image. The second interpolation image may be an image reproduced in an order of a second frame, a second interpolation frame, and a first frame. The second interpolation frame may be at least one frame and may be two or more frames.

The deep learning-based interpolation module 1520 may transmit the second interpolated image to the output image generation module 1530.

The output image generation module 1530 may generate an output image based on the second interpolated image received from the deep learning-based interpolation module 1520.

According to an embodiment of FIG. 15, the interpolation image is generated in the block-based interpolation module 1510 and the deep learning-based interpolation module 1520, but in accordance with an implementation example, the step of generating the interpolation image may be omitted. The output image generation module 1530 may generate an output image based on the first frame, the second interpolation frame, and the second frame. The detailed description related thereto will be described later with reference to FIG. 17.

Figure 16:
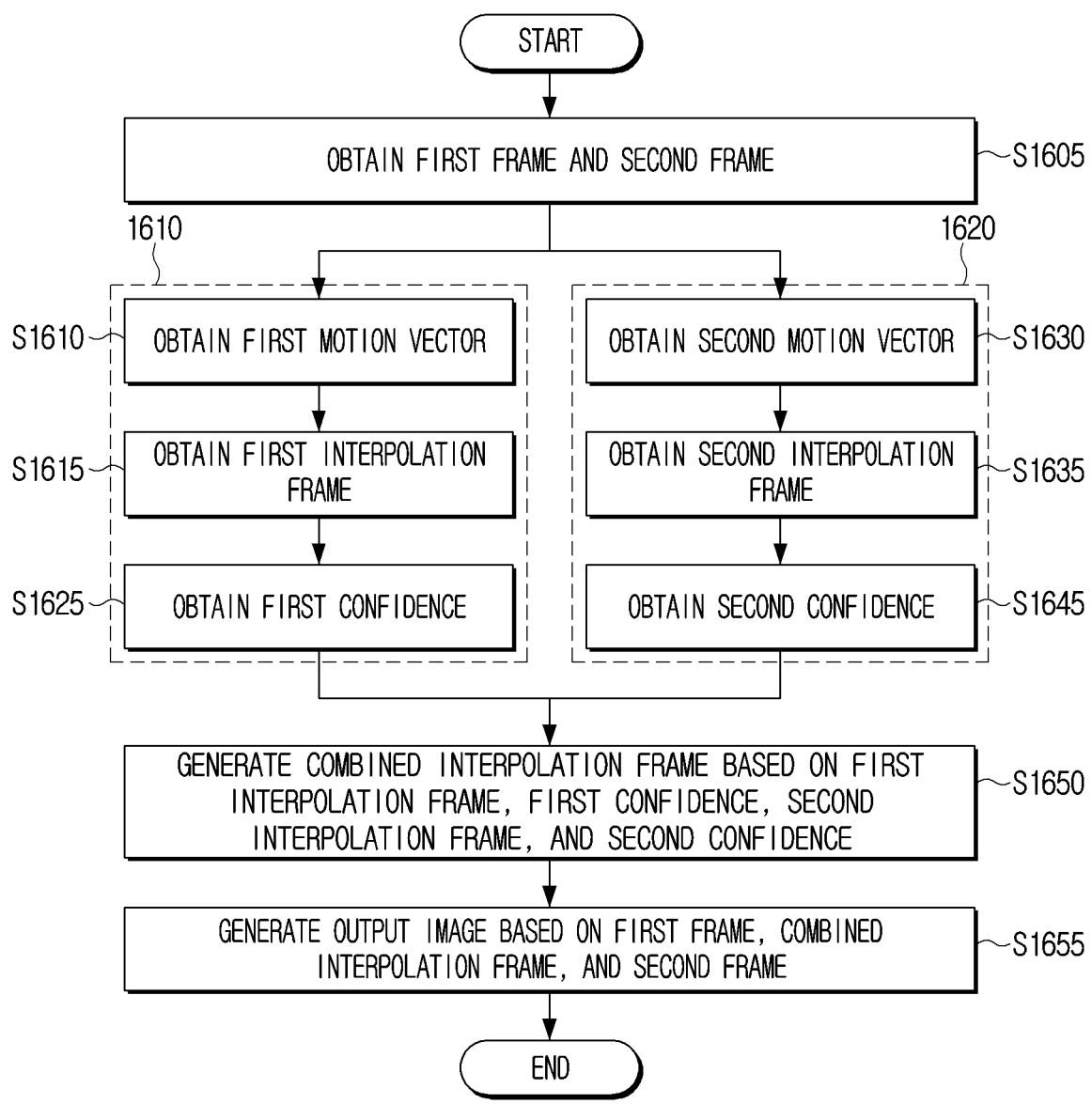
FIG. 16 is a diagram illustrating a method of generating an output image of an electronic apparatus according to another embodiment.

FIG. 16 is a diagram illustrating a method of generating an output image of an electronic apparatus according to another embodiment.

Referring to FIG. 16, the electronic apparatus 100 may obtain a first frame and a second frame in operation S1605. Since the description of the first and second frames has been described in detail with reference to FIG. 3, a detailed description thereof will be omitted.

The electronic apparatus 100 may obtain an interpolation frame and a confidence corresponding to each interpolation module by using a first interpolation module 1610 corresponding to a first interpolation method and a second interpolation module 1620 corresponding to a second interpolation method.

The operations of S1610, S1615, S1630, and S1635 may correspond to operations S510, S515, S530, S535 of FIG. 5 and a redundant description will be omitted.

The electronic apparatus 100 may obtain the first confidence based on at least one of the first motion vector or the first interpolation frame in operation S1625.

The electronic apparatus 100 may obtain the second confidence based on at least one of the second motion vector and the second interpolation frame in operation S1645.

The electronic apparatus 100 may generate a combined interpolation frame based on the first interpolation frame, the first confidence, the second interpolation frame, and the second confidence in operation S1650.

The electronic apparatus 100 may generate an output image based on the first frame, the second frame, and the combined interpolation frame in operation S1655. The output image may be an image reproduced in an order of the second frame, a combined interpolation frame, and a first frame.

Figure 17:
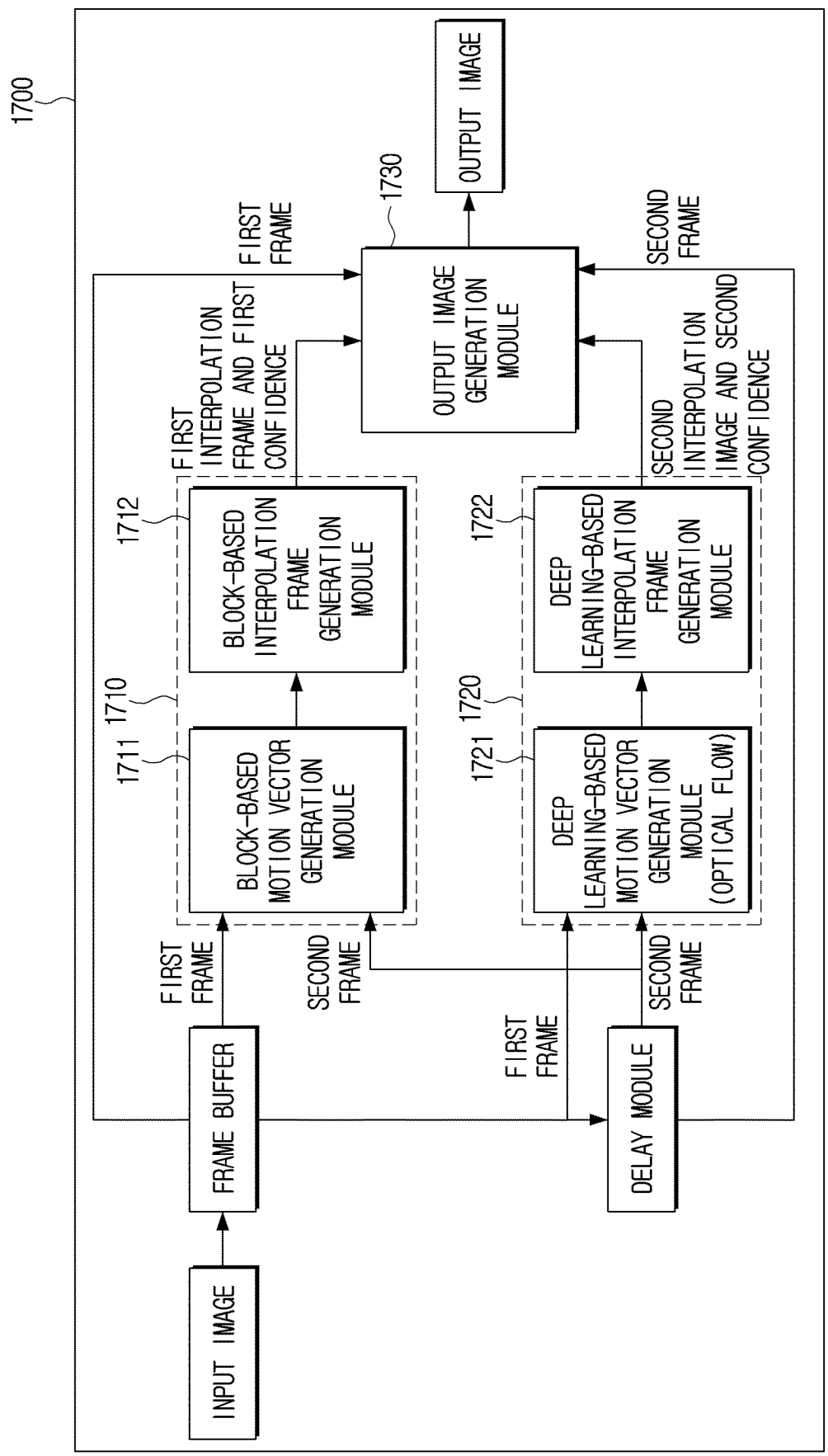
FIG. 17 is a diagram illustrating a specific operation of FIG. 16.

FIG. 17 is a diagram illustrating a specific operation of FIG. 16.

Referring to FIG. 17, according to an embodiment 1700, the electronic apparatus 100 may receive an input image, and may obtain a first frame and a second frame, which is a previous frame of the first frame, using the frame buffer and the delay module. Since the operation related to this is described in FIG. 3, a duplicate description will be omitted.

The electronic apparatus 100 may obtain a first interpolation frame based on a first interpolation method and obtain a second interpolation frame based on a second interpolation method.

The first interpolation method may be a block-based interpolation method, and the second interpolation method may be a deep learning-based interpolation method. The first interpolation module 510 may be a block-based interpolation module 1710, and the second interpolation module 520 may be a deep learning-based interpolation module 1720.

Here, the block-based interpolation module 1710 may include a block-based motion vector generation module 1711 and a block-based interpolation frame generation module 1712. The deep learning-based interpolation module 1720 may include a deep learning-based motion vector generation module 1721 and a deep learning-based interpolation frame generation module 1722.

The block-based motion vector generation module 1711 may obtain the first frame and the second frame. The block-based motion vector generation module 1711 may obtain a first motion vector based on the first frame and the second frame. The block-based motion vector generation module 1711 may transmit the obtained first motion vector to the block-based interpolation frame generation module 1712.

The block-based interpolation frame generation module 1712 may generate the first interpolation frame based on the received first motion vector.

The block-based interpolation module 1710 may transmit the first interpolation frame and the first confidence to the output image generation module 1730.

The deep learning-based motion vector generation module 1721 may obtain the first frame and the second frame. The deep learning-based motion vector generation module

1721 may obtain a second motion vector based on the first frame and the second frame. The deep learning-based motion vector generation module 1721 may transmit the obtained second motion vector to the deep learning-based interpolation frame generation module 1722.

The deep learning-based interpolation frame generation module 1722 may generate the first interpolation frame based on the received second motion vector.

The deep learning-based interpolation module 1720 may transmit the second interpolation frame and the second confidence to the output image generation module 1730.

The output image generation module 1730 may generate the combined interpolation frame based on the first interpolation frame received from the block-based interpolation module 1710 and the second interpolation frame and the second confidence received from the deep learning-based interpolation module 1720. The output image generation module 1730 may generate an output image based on the first frame received from the frame buffer, the generated combined interpolation frame, and the second frame received from the delay module. The output image may be an image reproduced in an order of the second frame, a combined interpolation frame, and the first frame.

FIG. 18 is a flowchart illustrating a method for controlling an electronic apparatus according to an embodiment.

Referring to FIG. 18, a method for controlling the electronic apparatus 100 includes obtaining two consecutive frames (e.g., a first frame and a second frame that is a previous frame of the first frame) of the input image, as input frames in operation S1805, obtaining a first interpolation frame of the input frames and a first confidence corresponding to the first interpolation frame based on a first interpolation method in operation S1810, obtaining a second interpolation frame of the input frames and a second confidence corresponding to the second interpolation frame based on a second interpolation method that is different from the first interpolation method in operation S1815, obtaining weights corresponding to the first interpolation frame and the second interpolation frame, respectively, based on the first confidence and the second confidence in operation S1820, and obtaining an output image based on the obtained weights in operation S1825.

The method may further include obtaining a first motion vector corresponding to the input frames based on the first interpolation method, obtaining the first interpolation frame corresponding to the obtained first motion vector based on the first interpolation method, obtaining a second motion vector corresponding to the input frames based on the second interpolation method, obtaining the second interpolation frame corresponding to the obtained second motion vector based on the second interpolation method, obtaining a combined interpolation frame based on the first interpolation frame and the second interpolation frame, and obtaining the output image based on the first frame, the second frame, and the combined interpolation frame.

The obtaining the first confidence and the second confidence in operations S1810 and S1815 may include obtaining the first confidence based on at least one of the first motion vector or the first interpolation frame, and obtaining the second confidence based on at least one of the second motion vector or the second interpolation frame.

The controlling method may further include obtaining down-sampled frames of the input frames based on the second interpolation method, obtaining a second motion vector corresponding to the obtained down-sampled frames, obtaining an up-sampled frame of the obtained second interpolation frame based on the second interpolation method, and obtaining a combined interpolation frame based on an up-sampled frame of the first interpolation frame and an up-sampled frame of the second interpolation frame.

The obtaining the down-sampled frames may include identifying an area in which a degree of motion is greater than or equal to a threshold value based on the first frame and the second frame, and obtaining down-sampled frames of the input frames by down-sampling the identified area.

The operation of obtaining a weight in S1820 may include obtaining a first weight corresponding to the first interpolation frame and a second weight corresponding to the second interpolation frame based on the first confidence and the second confidence, and the operation of obtaining the output image in S1825 may include obtaining an output image in which the first interpolation frame and the second interpolation frame are combined based on the first weight and the second weight.

The obtaining the first confidence and the second confidence in operations S1810 and S1815 may include obtaining the first confidence and the second confidence corresponding to pixels of the first interpolation frame and the second interpolation frame, respectively, obtaining weights in operation S1820 may include obtaining weights corresponding to each of pixel areas included in the first interpolation frame and the second interpolation, respectively, based on the first confidence and the second confidence, and obtaining an output image in operation S1825 may include obtaining the output image by applying the obtained weights to the obtained pixel areas, respectively.

The obtaining the first confidence and the second confidence in operations S1810 and S1815 may include obtaining the first confidence and the second confidence corresponding to pixels of the first interpolation frame and the second interpolation frame, respectively, obtaining weights in operation S1820 may include obtaining weights corresponding to each of pixel areas included in the first interpolation frame and the second interpolation, respectively, based on the first confidence and the second confidence, and obtaining an output image in operation S1825 may include obtaining the output image by applying the obtained weights to the obtained pixel areas, respectively, and the pixel area may include a plurality of pixels.

The obtaining the output image in operation S1825 may include, if the similarity (or accuracy) of the first confidence and the second confidence is less than the threshold value, obtaining the output image based on the second interpolation frame.

The first interpolation method may be a block-based interpolation method, and the second interpolation method may be a deep learning-based interpolation method.

The method for controlling the electronic apparatus shown in FIG. 18 may be performed on an electronic apparatus having the configuration of FIG. 1 or FIG. 2, and may be executed on an electronic apparatus having other configurations.

The methods according to the various embodiments as described above may be implemented as an application format installable in a related-art electronic apparatus.

The methods according to the various embodiments as described above may be implemented as software upgrade or hardware upgrade for a related-art electronic apparatus.

The various embodiments described above may be performed through an embedded server provided in an electronic apparatus, or an external server of at least one electronic apparatus and a display device.

According to an embodiment, the various embodiments described above may be implemented as software including instructions stored in a machine-readable storage media which is readable by a machine (e.g., a computer). The device may include the electronic apparatus according to the disclosed embodiments, as a device which calls the stored instructions from the storage media and which is operable according to the called instructions. When the instructions are executed by a processor, the processor may directly perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

According to an embodiment, a method according to one or more embodiments may be provided in a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by respective components prior to integration. Operations performed by a module, a program, or other component, according to various embodiments, may be sequential, parallel, or both, executed iteratively or heuristically, or at least some operations may be performed in a different order, omitted, or other operations may be added.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. An electronic apparatus, comprising:
a memory configured to store an input image; and
at least one processor configured to:
  obtain two consecutive frames of the input image as input frames, the two consecutive frames comprising a first frame and a second frame preceding the first frame;
  obtain a first interpolation frame corresponding to a first motion vector of the input frames and a first confidence corresponding to the first interpolation frame based on a first interpolation method;
  obtain a second motion vector corresponding to down-sampled frames of the input frames based on a second interpolation method that is different from the first interpolation method;
  obtain a second interpolation frame corresponding to the second motion vector of the input frames based on the second interpolation method;
  obtain an up-sampled frame of the second interpolation frame and a second confidence corresponding to the second interpolation frame based on the second interpolation method;
  obtain weights corresponding to the first interpolation frame and the second interpolation frame, based on the first confidence and the second confidence, respectively;
  obtain a combined interpolation frame based on an up-sampled frame of the first interpolation frame, the up-sampled frame of the second interpolation frame, and the weights; and
  obtain an output image based on the first frame, the second frame, and the combined interpolation frame.

2. The electronic apparatus of claim 1, wherein the at least one processor is further configured to identify an area of the input image in which a degree of motion is greater than or equal to a threshold value, based on the first frame and the second frame, and obtain the down-sampled frames of the input frames by down-sampling the identified area.

3. The electronic apparatus of claim 1, wherein the at least one processor is further configured to:
  obtain a first weight corresponding to the first interpolation frame and a second weight corresponding to the second interpolation frame, based on the first confidence and the second confidence, respectively; and
  obtain the output image in which the first interpolation frame and the second interpolation frame are combined based on the first weight and the second weight.

4. The electronic apparatus of claim 1, wherein the at least one processor is further configured to:
  obtain the first confidence and the second confidence corresponding to pixels of the first interpolation frame and the second interpolation frame, respectively;
  obtain the weights corresponding to the pixels included in the first interpolation frame and the second interpolation frame, respectively, based on the first confidence and the second confidence; and
  obtain the output image by applying the weights to the pixels, respectively.

5. The electronic apparatus of claim 1, wherein the at least one processor is further configured to:
  obtain the first confidence and the second confidence corresponding to pixels of the first interpolation frame and the second interpolation frame, respectively;
  obtain the weights corresponding to each of pixel areas included in the first interpolation frame and the second interpolation frame, respectively, based on the first confidence and the second confidence;
  obtain the output image by applying the weights to the pixel areas, respectively,
  wherein the pixel area includes a plurality of pixels.

6. The electronic apparatus of claim 1, wherein the at least one processor is further configured to, based on the first confidence and the second confidence being less than a threshold, obtain the output image based on the second interpolation frame.

7. The electronic apparatus of claim 1, wherein the first interpolation method is a block-based interpolation method and the second interpolation method is a machine learning-based interpolation method.

8. A method for controlling an electronic apparatus, the method comprising:

obtaining two consecutive frames of an input image as input frames, the two consecutive frames corresponding to a first frame and a second frame preceding the first frame;

obtaining a first interpolation frame corresponding to a first motion vector of the input frames and a first confidence corresponding to the first interpolation frame based on a first interpolation method;

obtaining a second motion vector corresponding to down-sampled frames of the input frames based on a second interpolation method that is different from the first interpolation method;

obtaining a second interpolation frame corresponding to the second motion vector of the input frames and a second confidence corresponding to the second interpolation frame-based on the second interpolation method that is different from the first interpolation method;

obtaining an up-sampled frame of the second interpolation frame and a second confidence corresponding to the second interpolation frame based on the second interpolation method;

obtaining weights corresponding to the first interpolation frame and the second interpolation frame, based on the first confidence and the second confidence, respectively;

obtain a combined interpolation frame based on an up-sampled frame of the first interpolation frame, the up-sampled frame of the second interpolation frame, and the weights; and obtaining an output image based on the first frame, the second frame, and the combined interpolation frame.

9. The method of claim 8, wherein the obtaining the down-sampled frames comprises identifying an area of the input image in which a degree of motion is greater than or equal to a threshold value based on the first frame and the second frame, and obtaining the down-sampled frames corresponding to the input frames by down-sampling the identified area.

* * * * *